United States Patent [19]

Stringer et al.

[11] Patent Number: 5,422,861

[45] Date of Patent: Jun. 6, 1995

[54] MEASURING METHOD AND APPARATUS

[75] Inventors: Bradley J. Stringer; Robert L. Kennington, both of Farmington, Utah

[73] Assignee: Quantronix, Inc., Farmington, Utah

[21] Appl. No.: 76,391

[22] Filed: Jun. 14, 1993

Related U.S. Application Data

[63] Continuation-in-part of Ser. No. 843,008, Feb. 28, 1992, Pat. No. 5,220,536, which is a continuation-in-part of Ser. No. 671,256, Mar. 18, 1991, Pat. No. 5,105,392, which is a continuation-in-part of Ser. No. 402,213, Sep. 1, 1989, Pat. No. 5,042,015.

[51] Int. Cl.⁶ .................................................. G01S 15/00
[52] U.S. Cl. ........................................ 367/99; 364/564
[58] Field of Search .............................. 367/99; 364/564

[56] References Cited

U.S. PATENT DOCUMENTS

| | | | |
|---|---|---|---|
| 2,689,082 | 9/1954 | Kolisch | 364/564 |
| 3,154,673 | 10/1964 | Edwards | 364/564 |
| 3,184,969 | 5/1965 | Bolton | 367/902 |
| 3,436,968 | 4/1969 | Unger et al. | 364/564 |
| 3,513,444 | 5/1970 | Henderson et al. | 356/379 |
| 3,588,480 | 6/1971 | Unger et al. | 367/564 |
| 3,819,918 | 6/1974 | Hale | 364/564 |
| 3,916,676 | 11/1975 | Boggs et al. | 73/609 |
| 4,029,176 | 6/1977 | Mills | 367/96 |
| 4,152,767 | 5/1979 | Laliotis | 364/560 |
| 4,161,715 | 7/1979 | Harris | 367/107 |
| 4,173,788 | 11/1979 | Laliotis | 364/560 |
| 4,237,737 | 12/1980 | Nitadori | 367/7 |
| 4,409,839 | 10/1983 | Taenzer | 73/625 |
| 4,419,384 | 12/1983 | Kane et al. | 427/560 |
| 4,490,801 | 12/1984 | Hagen et al. | 364/560 |
| 4,528,651 | 7/1985 | Brock et al. | 367/99 |
| 4,543,649 | 9/1985 | Head et al. | 367/96 |
| 4,572,203 | 2/1986 | Feinstein | 424/9 |
| 4,601,207 | 7/1986 | Steblay | 73/597 |
| 4,714,846 | 12/1987 | Pesque et al. | 310/317 |
| 4,745,808 | 5/1988 | Hagen | 367/902 |
| 4,748,846 | 6/1988 | Haynes | 73/290 V |
| 4,757,716 | 7/1988 | Nottingham et al. | 73/623 |
| 4,773,029 | 9/1988 | Claesson et al. | 364/564 |
| 4,838,696 | 6/1989 | Pryor | 356/372 |
| 4,855,608 | 8/1989 | Peterson et al. | 250/560 |
| 4,905,512 | 3/1990 | Hayashi | 250/221 |
| 4,916,674 | 4/1990 | Tendler | 367/99 |
| 5,042,015 | 8/1991 | Stringer | 367/99 |
| 5,105,392 | 4/1992 | Stringer | 367/99 |
| 5,163,323 | 11/1992 | Davidson | 364/560 |
| 5,175,692 | 12/1992 | Mazouz et al. | 364/478 |
| 5,184,733 | 2/1993 | Arnarson et al. | 356/376 |
| 5,187,981 | 2/1993 | Chen et al. | 73/642 |
| 5,208,586 | 5/1993 | Frilberg et al. | 340/932.2 |
| 5,220,536 | 6/1993 | Stringer et al. | 367/99 |

FOREIGN PATENT DOCUMENTS 8200143 11/1982 WIPO.

OTHER PUBLICATIONS

Operator's Manual for Defense Depot Ogden, Fairbanks Controls Operation, Feb. 4, 1985, pp. 1–6 and appended drawings #2–52723.

Space Weigh 2000 Brochure, Toledo Sclae, Mettler–Toledo, Inc., 1991.

"Dimension Scanner gives package handling a new yardstick", Material Handling Engineering, Feb. 1973, pp. 45–49.

*Primary Examiner*—Daniel T. Pihulic
*Attorney, Agent, or Firm*—Trask, Britt & Rossa

[57] ABSTRACT

A method and apparatus for measuring the dimensions and determining the three-dimensional, spatial volume of objects. An object detection system is employed to detect proper placement of an object to be measured, and waveguides are employed as standoffs and received wave isolators for reflected-wave sensors. An autocalibration method for ultrasonic sensors is also disclosed.

15 Claims, 10 Drawing Sheets

MEASURING METHOD AND APPARATUS

This is a continuation-in-part of U.S. Pat. No. application Ser. No. 07/843,008 filed Feb. 28, 1992, now U.S. Pat. No. 5,220,536 issued Jun. 15, 1993, which is a continuation-in-part of U.S. Patent application Ser. No. 07/671,256 filed Mar. 18, 1991, now U.S. Pat. No. 5,105,392 issued Apr. 14, 1992, which is a continuation-in-part of U.S. Patent application Ser. No. 07/402,213 filed Sep. 1, 1989, now U.S. Pat. No. 5,042,015, issued Aug. 20, 1991.

BACKGROUND OF THE INVENTION

The present invention relates generally to methods and apparatus for taking dimensional measurements of objects and, more specifically, to a method and apparatus for ascertaining three-dimensional measurements and/or volume of objects and methods of use and calibration of same.

Millions of packages per year are handled and shipped by United Parcel Service, Federal Express, and many other smaller courier and delivery services. These packages originate with federal, state, and local governments as well as private businesses of all sizes. In many instances, the charges by the carriers to their customers are based on the so-called "dim-weight factor" or "dimensional weight factor" (DWF) of the article being shipped, a fictitious dimension based on length times width times height in inches divided by a standard agency or association-recognized divisor or conversion factor, commonly 166 ($L \times W \times H \div 166$). The "166" divisor or conversion factor has been recognized and adopted by the International Air Transport Association (I.A.T.A). Even if an object or package is of irregular configuration, the dim weight, using the longest measurement each of length, width, and height, is still utilized for billing purposes. The volume computed by multiplication of object length times width times height may hereinafter be termed the "cubic volume," "spatial volume," or simply the "cube" of the object.

The measurements of the articles shipped are also critical so that the carrier can accurately determine the number of trucks, trailers, or other vehicles which will be required to transport goods to their destinations and so both customers and carriers can accurately estimate their warehousing and other storage needs.

In addition, article weight and measurements are also used to determine and predict weight and balance for transport vehicles and aircraft and to dictate the loading sequence for objects by weight and dimensions for maximum safety and efficiency.

Further, if orders of any items are to be packed into boxes, knowledge of object weight and dimensions would be useful for selecting box size and durability.

To date, it has been a common practice for the customer to manually "cube" or measure boxes or other articles with a ruler, yardstick, or other straightedge marked with units of length, generally inches, perform a calculation for "dim weight," and provide same to the carrier with the package. If the customer does not "cube" the articles, then the carrier performs the operation. Since these measurements and calculations are generally done hurriedly, there is an equal chance that the customer will be under or over charged. To add to the problem, there are many packages and other objects not susceptible to even a grossly accurate manual measurement of dim weight, for example and not by way of limitation, loaded pallets, tubes, drums, reels of hose, cable or wire, etc. Many machine and automotive parts are shipped "naked" with tags attached or, at most, bagged or shrink wrapped. It is obvious to one skilled in the art that a straightedge measurement to ascertain the greatest extent of each dimension will not be accurate in any of these instances to any degree whatsoever.

It is known to the inventors that a "jig"-type measuring system for packages has been used, with a base and two sides joining in a corner at 90° angles, each marked with gross dimensional units (to the nearest one inch) so that a cubic package can be placed on the base at the corner and measurements taken manually by looking at the markings and recording same, but again, the accuracy is limited by the care and eyesight of the measurer, and the time utilized is unreasonably long when thousands of packages are being shipped, as with Sears, K-Mart, or other large retailers.

In short, a quick, accurate means and method for determining the dimensions and the cubic volume or spatial volume of packages and other objects in a commercial or industrial setting has been lacking for many situations.

U.S. Pat. No. 5,042,015, assigned to the assignee of the present application, discloses practical and commercially successful means and methods for such object measuring of both stationary and moving objects, although the apparatus of the '015 patent requires that moving objects be aligned with the path of movement.

U.S. Pat. No. 5,105,392, assigned to the assignee of the present application, provides alternatives and improvements to the system of the '015 patent. The '392 patent discloses and claims a method and apparatus for three-dimensional measurement of large and irregular objects, such as palletized loads. The '392 patent also discloses and claims a method and apparatus for determining the actual length and width dimensions of randomly-aligned linearly moving rectangular objects by determining apparent length, apparent width, and the distance between an object corner facing to the side of the travel direction and the trailing edge of the object. These measurements were then employed to determine the actual object length and width via trigonometrically-based mathematical equations.

The methodology for moving object measurement as described in the '392 patent has been proven to be sound, as have the mathematical relationships, and has also been applied in U.S. Patent application Ser. No. 07/843,008, filed Feb. 28, 1992, now U.S. Pat. No. 5,220,536 and assigned to the assignee of the present application. The '008 application discloses and claims a method and apparatus for determining the length, width and height of randomly-aligned packages and other substantially rectangular objects by utilization of a combination of a light curtain and an ultrasonic distance sensor.

While the apparatus and methods of the foregoing patents and application have been extremely successful in the market and have, in fact, created an unprecedented commercial and industrial demand for dimensional measurement, these advances have also pointed toward a need for some refinements which may further enhance their utility and accuracy.

For example, the apparatus disclosed and claimed in the '015 patent for weighing and dimensional measuring of objects, illustrated in FIGS. 1 through 4 of this application and described on pages 9 through 26 of this specification, requires that an object to be measured be placed at a "zero point" 36 or 120 on a surface supporting the object for an accurate measurement of object length and width. If the object is not at the zero point when the sensors are activated, the apparatus will indicate a larger and false object length and/or width, depending upon the exact placement of the object and whether or not a moving object is being measured.

Similarly, and with particular reference to the apparatus of FIGS. 3 and 4, although other embodiments of the invention may be similarly affected, if an object is placed too close to an ultrasonic sensor (such as 14, 16 or 18) or too large an object is placed within the volume defined by the placement of sensors 12, 14 and 16 with respect to zero point 120, a false reading will result as the receiver of the ultrasonic sensor cannot react fast enough to convert the extremely short reflected ultrasonic wave travel time between the emitter, the object surface, and the receiver. Therefore, the receiver may not provide a meaningful signal indicative of any volume or, even worse, may pick up a previously-reflected ultrasonic wave which has subsequently reflected off of the sensor face, back to the object surface, and then back to the emitter. In such an instance, the increased wave travel time would be correlated to a smaller-than-actual object dimension and result in inaccurate storage or cargo placement or billing.

SUMMARY OF THE INVENTION

The present invention provides a means for detecting accurate object placement and thus ensuring that an object to be dimensionally measured using reflected-wave technology is located at the zero point before the measuring apparatus can be activated. Since, in most instances, a scale is incorporated into the dimensional measurement apparatus so that object weight may be substantially simultaneously ascertained with object dimensions, the design of the placement detection means enables it to be located so that it is isolated from, and not supported by, the platform or other object support surface of the scale.

A preferred embodiment of the placement detection means of the present invention comprises a light beam emitter such as an LED, paired in side-by-side relationship with a receiver such as a phototransistor, the paired sensor team being supported by the base of the apparatus, located under the zero point and aimed upwardly at an aperture in the scale platform at the zero point. The emitter may be fired periodically or activated continuously, but if no object is placed over the zero point the light beam from the emitter will not be reflected back to the receiver to complete a circuit so that the measuring apparatus can be activated. Conversely, if the zero point is covered, the reflected beam will complete the circuit and enable the apparatus so that it can be triggered manually or automatically.

Another aspect of the present invention resides in the use of waveguides in front of the ultrasonic or other reflected wave sensors employed in the present invention to provide a standoff from the sensor, prevent too close placement of an object in relation to the sensor face and prevent receipt by the sensor of stray reflected waves, thus reducing the potential for error or false signals from the measuring apparatus. It is also contemplated that the aforementioned placement detection means may be employed to disable a sensor when an object is placed in too close a proximity to the sensor face.

The two above-mentioned aspects of the invention are particularly beneficial when employed together in the same apparatus, and are further enhanced by the addition of an improved method of sensor calibration for ultrasonic sensors, which method is also disclosed herein.

BRIEF DESCRIPTION OF THE DRAWINGS

The present invention will be more fully understood by one skilled in the art through a review of the following detailed description of the preferred embodiments taken in conjunction with the accompanying drawings wherein.

DETAILED DESCRIPTION OF THE PREFERRED EMBODIMENTS

Ultrasound technology is extremely safe, emitting no radiation; visible, ultraviolet, or infrared light; audible sound; odor; or heat. Further, ultrasound, as used in the present invention, will not damage a package or its contents during the measurement operation. Finally, an ultrasonic sensor of the type utilized in the present invention has no moving parts and is essentially maintenance free.

The preferred ultrasonic transducers or sensors employed with the present invention are electrostatic, although piezoelectric transducers may be employed. The preferred electrostatic sensors operate at a frequency of 49.6 kHz with a maximum current draw of 130 milliamps at 12-17 volts DC. Suitable sensors are potted electrostatic transducers in stainless steel housings with circuit cards produced by Lundahl Instruments, 710 North 600 West, Logan, Utah 84321, while the transducer units themselves are manufactured by Polaroid and Texas Instruments. The sensors are operable over a temperature range of 0 to 50 degrees C. and at relative humidity levels of 90 percent or less, noncondensing. The higher frequency (>120 kHz) piezoelectric sensors are not preferred due to the fact that, while their resolution exceeds that of the electrostatic transducers, they are also highly directional so as to require multiple transducers to sweep a particular dimension if widely varying sizes of packages and package profiles are to be encountered. In addition, the directionality requires a precise orthogonality of the side of the object to be measured relative to the sensor.

Figure 1:
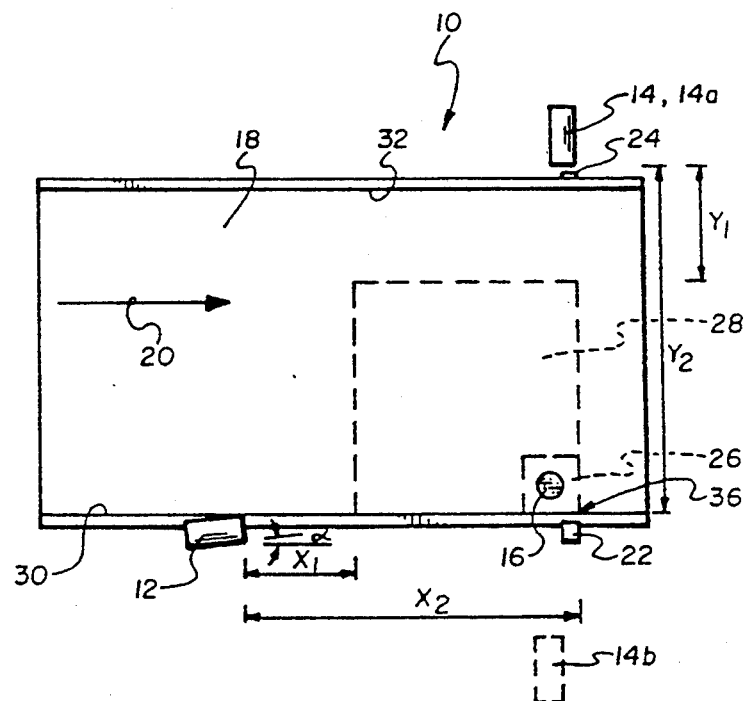
FIG. 1 comprises a schematic top elevation of a first preferred embodiment of the present invention.
Figure 2:
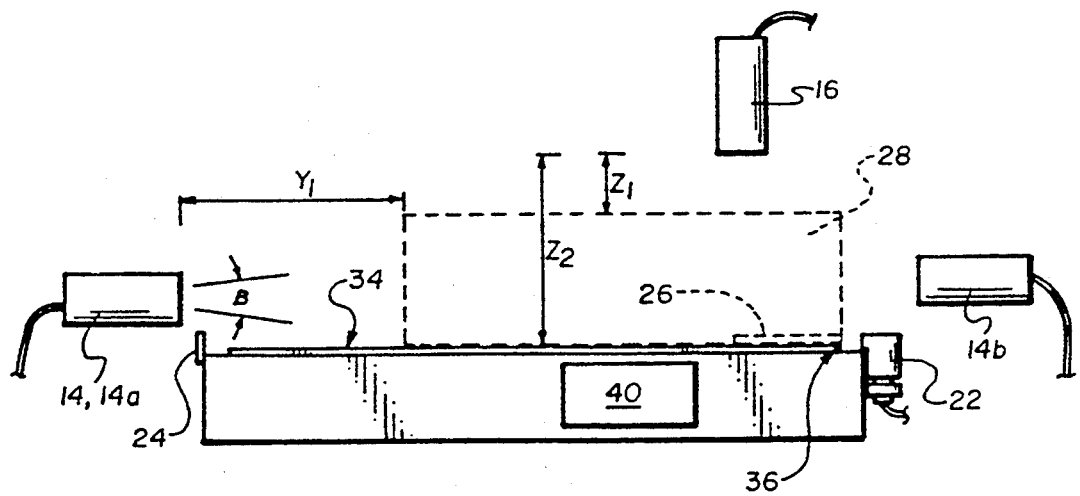
FIG. 2 comprises a schematic side elevation of the embodiment of FIG. 1.

Referring now to FIGS. 1 and 2 of the drawings, top and side views, respectively, of a first preferred embodiment of the invention are depicted in schematic form. Dynamic measurement unit 10 of the present invention comprises three ultrasonic transducers or sensors 12, 14, and 16, deployed at conveyor means 18, conveyor means 18 being a belt-type, roller-type, tow line or other conveyor, as known in the art. An automated guided vehicle (AGV) may also be employed to carry or move the object past the sensors. Sensors 12, 14, and 16 are functionally identical and interchangeable.

As shown by arrow 20 in FIG. 1, the direction of motion in this example is left to right. Given that orientation of movement, photocell 22 and retroreflector 24 are preferably mounted substantially in lateral alignment with sensors 14 and 16 so as to trigger a measurement when the leading edge of a large object 28 or small object 26 interrupts the light beam between photocell 22 and retroreflector 24. Photocell 22 may be any commercially available photocell, preferably operating in the infrared polarized light range. Proximity sensors of various types, including but not limited to magnetic or capacitive, may also be employed. A suitable photocell polarized with a sunlight immunity of 10,000 foot candles is the Model 1456A-6517, manufactured by Opcon of 720 80th Street, S.W., Everett, Wash. 98203-6299. Polarization is desirable to eliminate problems with reflectivity of the object breaking the photocell beam.

Sensor 12, as shown, is utilized to measure the length of object 26 or 28, "length" being an arbitrary term used in this instance to designate the dimension of an object taken in a direction parallel to that of the direction of conveyor motion 20. Sensor 12, as shown in FIG. 1, is mounted horizontally and substantially parallel but at a slight angle $\alpha$ to the direction of motion of the conveyor means 18. Sensor 12 is mounted so that it is to the side 30 of conveyor means 18 with which objects 26, 28 have been previously aligned. Such alignment may be accomplished by any means known in the art such as a set of angled or skew conveyor rollers upstream of station 10. The reason for this alignment will be explained hereafter in detail. The slight angular orientation and lateral offset of sensor 12 from conveyor means 18 is easily compensated for by simple geometrical calculations, it being appreciated that to place sensor 12 in alignment with the conveyor means motion would result in it being hit by objects thereon or requiring some means to raise and lower the sensor or swing it away from an approaching object and back into position after the object has passed.

Sensor 14, as shown, is utilized to measure the width of object 26 or 28, "width" being an arbitrary term used in this instance to designate the dimension of an object taken in a direction horizontally perpendicular to the direction of conveyor motion 20. Sensor 14 is also mounted in a horizontal attitude and to the side 32 of the conveyor means 18 opposite the side 30 thereof where object alignment has taken place. Sensor 14 should be mounted, as shown in FIG. 2, just high enough above the surface 34 of conveyor means 18 so that its ultrasonic waves will not be reflected by surface 34 but not so high that the waves, which spread in a generally conical pattern from the sensors with an included angle $\beta$ of 7 to 12 degrees (shown greatly exaggerated in FIG. 2), will miss the lowest object, such as small flat object 26, the width of which is to be measured by station 10.

Sensor 16, as shown, is utilized to measure the height of object 26 or 28, "height" being an arbitrary term used in this instance to designate the dimension vertically perpendicular to the direction of conveyor motion 20. Sensor 16 is mounted in a vertical attitude and preferably adjacent to and to the inside of the side 30 of conveyor means 18 whereat alignment takes place. Of course, it should be placed above the surface 34 of conveyor means 18 at a height great enough so as to clear the tallest object placed on surface 34.

Once the sensors 12-16 have been mounted, a "zero point" for object measurement is established. This "zero point" 36 coincides with an object having zero length, zero width, and zero height and can be anywhere on the length of conveyor means 18 but must be, for this embodiment, on the side 30 where objects 26 or 28 are aligned.

After sensors 12-16 are mounted and the zero point 36 selected, the positions of sensors 12-16 are adjusted in response to placing a target object of known dimension in the measuring field or volume adjacent zero point 36, as shown in FIGS. 1 and 2, and triggering the sensors, then subsequently adjusting the sensor positions and resulting system output until it corresponds to the known values. A one foot cube, twelve inches on a side, is typically utilized as reference. The dimensions of the object measured by sensors 12-16 are directly related to travel time of the ultrasonic waves emitted and reflected. For length sensor 12, the interruption of the infrared beam between photocell 22 and retroreflector 24 by the leading edge of the object to be measured triggers initial measurement of the distance $X_1$ between the face of sensor 12 and the trailing edge of the object to be measured.

Distance $X_1$ is then geometrically corrected for angle $\alpha$ to a true distance between sensor 12 and the trailing edge of the object and subtracted from known distance $X_2$ between sensor 12 and zero point 36 to give the length dimension X of the object ($X=X_2-X_1$).

To measure the width of an object, sensor 14 is triggered by photocell 22 and measures the distance $Y_1$ between the face of sensor 14 and the near side edge of the object. Since the distance $Y_2$ between sensor 14 and the zero point 36 at side 30 of conveyor means 18 is a known constant, the width Y of the object is equal to $Y_2-Y_1$. In similar fashion, the height distance $Z_1$ is measured between the face of sensor 16 and the top of the object and subtracted from the known distance $Z_2$ between sensor 16 and surface 34 to provide the height Z of the measured object.

It should be understood that the term "measure" does not necessarily indicate that only a single measurement is taken of each dimension by each sensor. In fact, measurements can be taken numerous times in a burst of ultrasonic waves which are emitted, reflected, and received. However, such multiple measurements are not deemed necessary and are therefore not preferred due to the additional time required. For example, measurements may be taken sequentially for 0.17 second by each sensor at a rate of 12 times per second and the resulting wave travel time signals for each sensor averaged to give a value $X_1$, $Y_1$, or $Z_1$. It is thus apparent that such an approach would take over 0.5 seconds for three-dimensional measurement, a major consideration and a disadvantage when the object measured is moving at a high rate of speed. Utilizing the sensors previously referred to above, dimensional measurements can be taken with dynamic measurement unit 10 to an accuracy of ±0.1 inches.

Due to the fact that measurements are taken while the conveyor means 18 is carrying objects past dynamic measuring unit 10, it is necessary to compensate the length measurement for the speed of the conveyor means in some manner. An adjustment in data calculations by a microprocessor used to control unit 10 is one solution. The speed of conveyor means 18 is known a priori. The "lag time" between triggering and firing of the length sensor 12 is a constant which is calculated or measured. If the lag time is multiplied by the conveyor means speed, this produces the "lag distance," i.e., the distance an object will travel on conveyor means 18 between triggering and firing of sensor 12. The lag distance can then be added via the software in a processor to the sensed (incorrect) distance to yield true length.

A simpler and more preferred solution for conveyor speed compensation is to move photocell 22 and retroreflector 24 along conveyor means 18 upstream of zero point 36. If an object of known length is placed on conveyor means 18, a measurement triggered by photocell 22 is taken and the measured length is too short, photocell 22 is moved upstream from zero point 36. For a conveyor means carrying objects at 90 feet per minute past unit 10, the final photocell position will normally be 0.7 inches upstream of zero point 36.

In lieu of moving photocell 22, the position of length transducer or sensor 12 may be altered. If the article length is measured as it travels away from sensor 12 on conveyor means 18, sensor 12 can be moved downstream by the lag distance units of length. If article length is measured as it travels toward sensor 12, sensor 12 is also moved downstream by the lag distance.

Optionally, in lieu of utilizing ultrasonic sensor 12 for length measurement, length may be measured using the photocell 22, the triggering thereof by an object commencing a clock timing which, when correlated to the speed of the conveyor means, results in an accurate measurement of length directly related to the time between which photocell 22 is switched off by an object and the time it is turned on again when the trailing edge of the object passes. The known speed of the object (conveyor speed) is multiplied by the "dark time" during which the light beam of photocell 22 is interrupted and the object length thereby ascertained. This technique may also be employed with the previously referenced proximity sensors.

While unit 10 has been described in terms of a single embodiment, other optional configurations are available and achievable. For example, instead of aligning objects with side 30 of conveyor means 18, they may be placed randomly anywhere on conveyor surface 34 so long as they are straight or aligned with the direction of motion. In such an instance, two sensors, 14a and 14b, are placed directly opposite one another across conveyor means surface 34, and both are triggered at the same time, sensor 14a measuring a distance $Y_1$, 14b measuring distance $Y_2$, and $Y_1$ and $Y_2$ being subtracted from known distance $Y_3$ between the faces of sensors 14a and 14b to give width Y of the object.

Length sensor 12 may also be placed aiming upstream with respect to motion 20 and placement adjusted accordingly with respect to zero point 36. If software compensation is employed, the lag distance is then subtracted from the measured distance to arrive at the correct length.

If extremely wide or tall objects of uneven configuration are to be measured, such as pallets loaded with boxes or other merchandise, several sensors 14 and 16 may be placed at adjacent locations to cover the entire possible width or height to be encountered.

Finally, it may be desirable to simultaneously weigh the objects being measured at unit 10. For this purpose, weighing unit 40 may be placed under surface 34 of conveyor means 18 and triggered by photocell 22 in the same manner as sensors 14–16 by photocell 22. One suitable device for on-the-fly weighing is the Weigh-Tronix Model CVSN-3660-200, manufactured by Weigh-Tronix, Inc. of 1000 Armstrong Drive, Fairmont, Minn. 56031. Of course, the weighing device 40 utilized depends upon the design loads of unit 10.

If an AGV is utilized to move objects past sensors 12–16 of a unit 110, the weighing unit 40 may be placed under the floor and the scale tared to the weight of the unloaded AGV.

It should be noted that ultrasonic waves generated by sensors 12, 14, and 16 of the type employed in the present invention are affected in their travel time by temperature, barometric pressure and humidity and that it is therefore desirable to compensate for variations in same when processing the measured travel times. Such compensation can be via look-up tables in a computer memory or by microprocessor correction using known equations for the effects of these variables. However, the preferred method of the present invention is to use the wave travel time for a known distance to compensate for these effects.

For example, in dynamic unit 10 and in subsequently described static measurement unit 110, the height measurement sensor 16 is triggered when no object is present in the measuring field or volume. The height sensor is utilized because of the large target presented by the conveyor surface (unit 10) or platen (unit 110), as the case may be. Since the distance between the face of sensor 16 and the target is known, the number of "counts" of the high frequency clock in the control system 200 associated with the present invention per inch of measured distance can be computed. For example, if the nominal time per unit distance round trip in "counts per inch" is 590, using a clock frequency of 4 MHz and a measurement by sensor 16 of a known 30 inch distance therefore normally produces 17,700 "counts" of travel time; in the event that the travel time takes 17,730 "counts," the system self-adjusts to utilize 591 "counts per inch" as the time per unit distance reference to accommodate to longer wave travel time. This corrected figure is then applied to the actual object measurements made using sensors 12–16 in order to produce a more accurate result.

The calibration of the system is self-commanded upon startup (see FIG. 7) and is periodically repeated in response to software commands or, optionally, may be induced periodically by a timer circuit command.

It is also desirable to provide an override for measurements in excess of the maximum design dimension to be measured falling in the "near field space" in front of the sensors, as the travel time of the reflected ultrasonic waves is too short for accurate processing given reaction time lags in the sensors and processing equipment. Therefore, it is desirable to provide so-called "blanking zones" for a certain distance in front of the sensors where no measurements will be taken for wave travel times below a certain minimum. Finally, it is desirable to adjust the sensitivity of the sensors to respond as receivers only to a minimum amplitude of reflected signal or echo from the objects being measured in order to avoid spurious measurements attributable to other objects or structures within range of the sensor.

Figure 3:
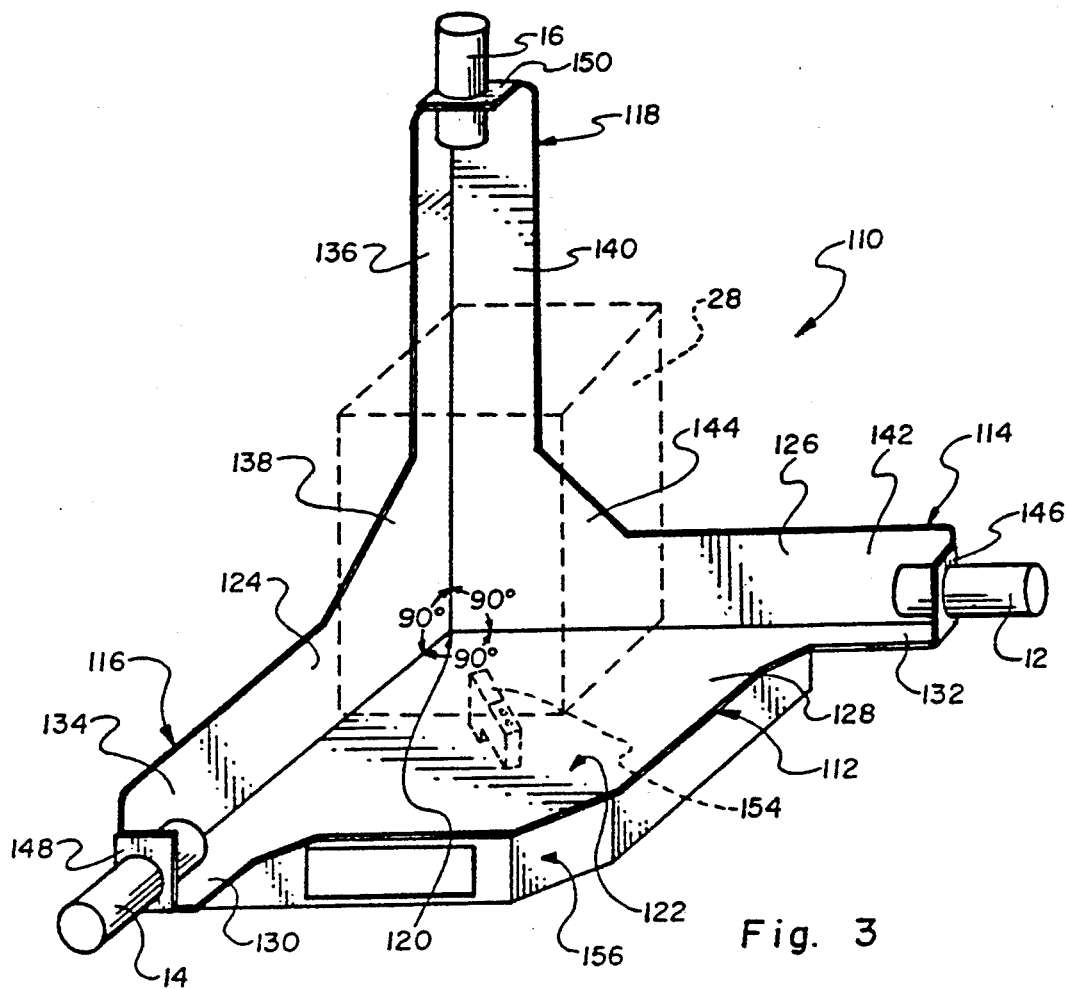
FIG. 3 comprises a perspective elevation of a second preferred embodiment of the present invention.
Figure 4:
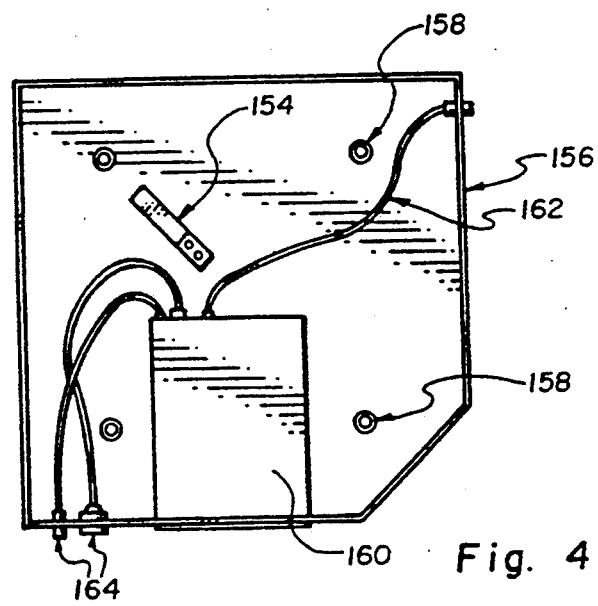
FIG. 4 comprises a top elevation of the embodiment of FIG. 3 with the jig removed from the support housing.

Referring now to FIGS. 3 and 4 of the drawings, stationary measuring unit 110 will be described in detail. Unit 110 includes the same basic components as unit 10 but in a substantially different configuration. As in unit 10, sensors 12, 14, and 16 measure the length, width, and height of a small object 26 or large object 28 and are preferably identical to those of unit 10. In this instance, however, the sensors are mounted on a jig 112. Due to the measured object being stationary while measurements are taken, the accuracy of unit 110 is greater than that of dynamic unit 10 and may approach ±0.01 inches.

Jig 112 comprises three arms 114, 116, and 118 disposed at mutually perpendicular angles to one another so as to join at corner 120 which also serves as the "zero point" for unit 110. Jig 112 is fabricated from heavy gauge sheet stock, such as anodized aluminum, and comprises base 122, left side 124 and right side 126. Base 122 includes object support platen 128 and arm extensions 130 and 132. Left side 124 includes arm extensions 134 and 136 which meet at crotch 138. Right side 126 includes arm extensions 140 and 142 which meet at crotch 144. Arm extensions 132 and 142 join at a 90° angle and coextensively form arm 114, arm extensions 130 and 134 join at a 90° angle and coextensively form arm 116, and arm extensions 136 and 140 join at a 90° angle and coextensively form arm 118. At the end of each arm, sensor mounting plates 146, 148, and 150 hold sensor 12, 14, and 16, respectively, in positions parallel to their respective arms 114, 116, and 118 and aimed inwardly at zero point 120.

Jig 112 is mounted on support housing 156 via load cell 154 which is shown in broken lines under base 122. Support housing 156, like jig 112, is fabricated of heavy gauge sheet stock. Load cell 154 is preferably a high precision steel-type load cell, and a suitable model using a dual bridge strain gage is Model No. 60048A, available from Sensortronics of 677 Arrow Grand Circle, Covina, Calif. 91722. Load cell 154 is rigidly anchored at its bottom to the bottom of support housing 156, as by bolts, and its off-set top to base 122, again as by bolts. Load cell 154 is designated to accept off-center loads and so is ideally suited for its application in unit 110 where, as shown in FIG. 3, object 28 has a length greater than its width. However, it was unexpectedly discovered that load cell 154 could be utilized as the single weighing means with unit 110 even if the load is significantly off-center without a noticeable diminution of accuracy so long as the horizontal axis of the load cell is oriented toward the zero point 120 of unit 110 and on a line of symmetry at the midpoint (45°) of the 90° angle between arms 114 and 116. The distance of load cell 154 from the zero point 120 is important as is the direction load cell 154 is facing (either toward or away from zero point 120) due to the differing amounts of torque exerted on load cell 154 by platen 128 and the object being measured. However, the foregoing is not as critical as the alignment symmetry of the load cell.

Support housing 156 is equipped with four small screw-type jack stands 158 to accommodate loads in excess of the rated capacity of load cell 154 so as to prevent damage thereto. Support housing 156 also accommodates integral electronics 160 for unit 110 which will be described further hereafter. Internal electronics 160 comprises a rack-mounted assembly slidably disposed behind cover plate 166 of support housing 156, the assembly communicating with sensors 12, 14, and 16 via cables 162 and connectors 164 as is well known in the art, connectors 164 mating with other connectors and cables (not shown) running outside support housing 156 to the sensors to a power supply and to external electronics which may include a bar code reader, triggering switches, a host computer, and/or a display means such as a printer or LED display, etc.

After the dimensions of an object are measured, the volume thereof may be computed, and the dimensions may be added to determine girth of the object or may be sorted to classify objects as to one or more dimensions. As noted previously, weight may also be ascertained with unit 10 or unit 110.

The dimensional data may, of course, be displayed via LED or other displays as known in the art and calculated by hand. However, it is preferable that the measuring and calculating operations be controlled and performed by a programmed processor. It will be understood by those skilled in the art that English or metric units may be employed in displays or other outputs as well as in calculations.

Figure 5:
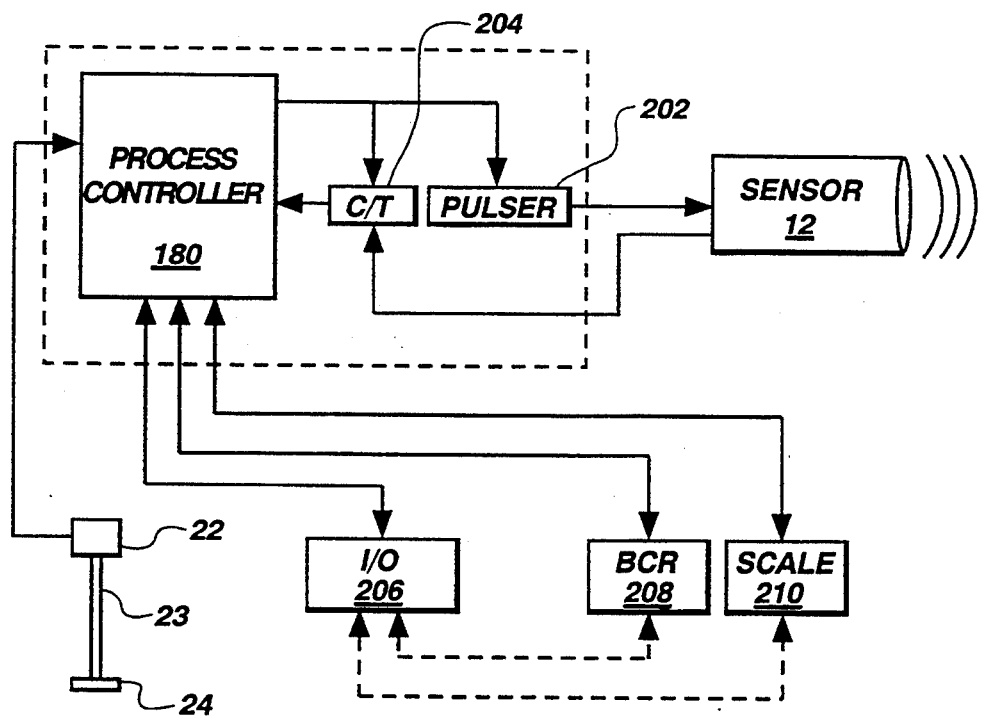
FIG. 5 comprises a macro schematic for the electronics associated with the present invention.

One potential control and processing system for sensors 12, 14, and 16 is schematically depicted in FIG. 5. The system as depicted includes a single transducer or sensor designated by way of example as 12 which is ultimately controlled by a process controller 180. Unit 180 does, in fact, control sensors 12, 14, and 16, but for simplicity's sake, only a single sensor is shown. Sensor 12 is triggered by the interruption by an object of the beam 23 between photocell 22 and retroreflector 24 (FIG. 5) in the instance of unit 10 and by the operator in the case of unit 110. Process controller 180, in response to photocell 22, produces a trigger signal sent to pulser 202 and counter/timer 204 causing pulser 202 to transmit an activation signal to sensor 12 and counter/timer 204 to start counting. If static measurement unit 110 is being controlled, pulser activation may be triggered by a timer, footswitch, software command, or other suitable means via unit 180. The pulser signal causes sensor 12 to transmit an ultrasonic signal burst toward the object to be measured. Generally, each burst of ultrasonic signals comprises one to four signals. It is desirable, as noted previously, to provide a variable amplitude control which may be provided in pulser 202 or controlled by unit 180 but is preferably included in sensor 12. Pulser 202 signals sensor 12 via electrical cable (not shown in FIGS. 1-4) in a manner well known in the art. The ultrasonic signals are reflected from the object to be dimensionally measured and received by sensor 12 whereupon they are converted to electrical signals. Sensor 12 contains signal detection circuitry to convert the electrical signals to signals suitable for manipulation by process controller 180. Such circuitry is known in the art and includes means for adjusting sensitivity such as a variable threshold circuit, a variable amplifier for increasing the amplitude of signals relayed to the processor from the sensor, and/or (as noted above) circuitry for boosting the amplitude of the pulser signals sent to the sensor.

Signals received by sensor 12 from the object reflecting the ultrasound waves are amplified by an amplifier therein and wave shaped by a comparator associated therewith, with the latter being synchronized with the incoming signals from pulser 202 so that the comparator output is always positive. The gain of the amplifier and the threshold of the comparator are preferably controllable at sensor 12.

As noted above, counter/timer 204 is controlled by a start input from process controller 180 and a stop input from sensor 12. When pulser 202 is triggered by unit 180, counter/timer 204 is started, and when an output signal is received from sensor 12, counter/timer 204 is stopped. Thus, the time interval between a transmitted sensor pulse and the receipt of a reflected sensor signal is measured and output to process controller 180 wherein the time interval is converted first to a distance and then to a dimension of the measured object. Of course, system delays (i.e., time lags due to circuitry and components) must be compensated for, as known in the art, unless the outgoing signal time lags and incoming signal time lags cancel.

Process controller 180 communicates with input/output means 206 which can comprise a host computer such as any commercially available personal computer or a dumb terminal in more sophisticated operations, a larger computer controlling numerous measuring stations. The output of the unit 180 can be digitally displayed, as on a computer screen or via LED display, can be produced as hard-copy via printer or can be relayed to memory (RAM, hard disc, floppy disc) associated with an input/output means 206 and/or transmitted to any other location desired.

In order to correlate a measurement series (length, width, height) and calculated volume or total dimensions with a particular object measured, bar code reader (BCR) 208 is utilized to read a bar coded sticker or label affixed to the object measured, either before or after the measurement has taken place. Bar code reader 208 preferably outputs to process controller 180 but may alternatively output to input/output means 206.

As noted previously, both units 10 and 110 may optionally incorporate a weighing means or scale 210 to weigh the object measured simultaneously with the dimensional measurement. Preferably, weighing means 210 is triggered by process controller 180 and outputs thereto, and then dimensions, volume and weight output from process controller 180 to input/output means 206. Weighing means 210 may alternatively provide weight data directly to input/output means 206 in a form readable by means 206 for display, memory, or further transmission.

Figure 6:
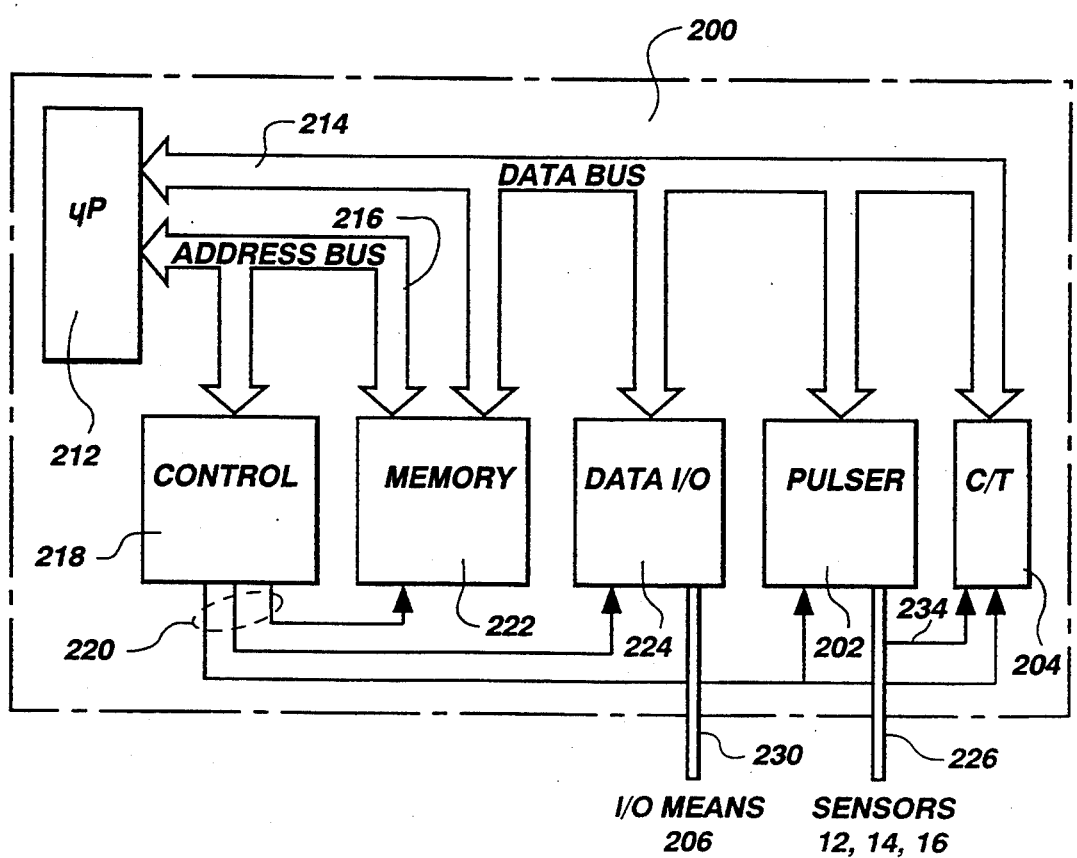
FIG. 6 comprises a block diagram of the control unit associated with the present invention.

While process controller 180 has been referred to merely as a single component, it will be understood by those skilled in the art that the term "process controller" may, and in fact does, encompass a plurality of components, including a microprocessor, memory, data bus, address bus, timing and control bus, registers, and an interface device such as an input/output controller. The process controller may be custom-built for use with unit 10 or 110 or may be a commercially available unit programmed to act in the manner desired. In any event, the hardware involved is well known to those skilled in the art. FIG. 6 depicts a preferred embodiment of a control unit 200 in the form of a block diagram wherein all of the component elements of process controller 180, pulser 202, and counter/timer 204 are all incorporated as a part thereof.

Referring to FIG. 6, the preferred embodiment of the control unit 200 associated with the present invention includes a number of components known in the microprocessor/computer art, the major ones of which will be discussed below. Briefly, control unit 200 includes a central processing unit (CPU) 212, address bus 216, data bus 214, a control circuit 218 which commands memory 222, data input/output 224, pulser 202, and counter/timer 204 via timing and control lines 220 (which may also be referred to as a timing and control bus 220).

Control unit 200 communicates with an input/output means 206, as previously noted, via bus or cable 230, while pulser 202 communicates with sensors 12, 14, and 16 via bus or cables 226. It should be noted that sensor output signal line 234 extends from bus 226 to provide a "stop" signal to the counter/timer 204 as previously described with respect to FIG. 5.

CPU 212 preferably comprises an 8 bit Zilog Z84C00 microprocessor. Address bus 216 and data bus 214 are entirely conventional and will not be described in detail. Control circuit 218 includes one or more address decoders and a plurality of logic gates (latches) to control, via lines 220, the type and sequence of operations performed by the system as determined by CPU 212. Memory 222 preferably comprises two 8 kbit×8 EPROM's, one serving as storage for the mathematical operations performed by the system and one as storage for the program master memory for CPU 212. In addition, memory 222 preferably includes an 8 kbit×8 static RAM for temporary data storage and calibration factors used in correcting sensor measurements. Data input/output 224 preferably comprises a Zilog Z84C42 Serial Input/Output Controller and a MAX232 Signal Driver, produced by Integrated Maxim Products, 120 San Gabriel Drive, Sunnyvale, Calif. 94086, for modifying the system's TTL protocol to RS-232. Pulser 202 comprises a conventional tri-state latch for sequentially triggering sensors 12, 14, and 16. Counter/timer 204 includes a plurality of conventional line buffers and drivers and a Zilog 284C30 Counter/Timer Circuit including a 4 MHz clock. Counter/timer 204, via the serial input/output controller, determines the communication baud rate of the RS-232 interface, in this instance, preferably 9600 baud. The counter/timer circuit can also be employed to initiate periodic maintenance routines to auto zero the system, or, as in the preferred embodiment, such initiation can be software commanded.

The program language is Z80 assembly, as dictated by the selection of the Z84C00 CPU, although the numerical processing portion of the program using floating point arithmetic is in "C", cross compiled to Z80 assembly.

It will be appreciated by those skilled in the art that many alternative circuit components and other program languages may be employed in and with the present invention. The foregoing specifically noted elements have been provided by way of example only and are not to be construed as in any way limiting the present invention thereto.

Preferably, the input/output means 206 communicates with control unit 200 via an RS-232 cable, modem, or other suitable interface utilizing an EIA RS-232-C serial communication protocol and employing encoded ASCII or EBCDIC. Other protocols may be employed such as IBM bisynchronous, 3270, SNA, HDLC, SDLC, and others. If control unit 200 is used with a host computer, control unit 200 recognizes and responds to the following commands from input/output means 206:

M—Measure. This command may be sent by the host computer or may be initiated directly via a signal from photocell 22, in the case of dynamic measurement unit 10, or from a hand or foot switch in the case of static measuring unit 110.

I—Install. This command sets up and calibrates the sensors upon initial installation of the unit.

C—Calibrate. This command, issued by the host computer 206 or self-commanded by control unit 200 after an object is measured, causes control unit 200 to trigger height sensor 16 and to subsequently perform internal humidity and temperature compensation as heretofore described.

R—Reset. This command, which may be entered manually on control unit 200 via a push button or received from host computer 206, clears all registers and wait conditions in the control unit and causes control unit 200 to recalibrate itself.

T—Test. This command causes the measurement process to start and repeat until any other command is received.

S—Send Status. Received from host computer 206.

Control unit 200 normally responds "O" for okay, meaning communications between the two via RS-232 interface are operable.

B—Bad transmission. Host computer 206 sends to control unit 200 when transmission therefrom was garbled or otherwise not understood. Control unit 200 then retransmits the last data field to host computer 206 from buffer memory. Conversely, control unit 200 will send a "B" to the host computer 206 if a command is not received properly or not understood.

Control unit 200 will also recognize certain command set output qualifiers which are set by sending a qualifier letter from the host computer and remain in effect until the same letter is sent again, until the system is reset, or at system power up.

D—Display count. This causes transmission of certain register counts for diagnostic purposes.

A—Actual measurement. Will cause control unit 200 to send an actual measurement even if less than a preset minimum threshold value.

E—Error output. Causes control unit 200 to send a signal to host computer 206 if there is a hardware error in sensor 12, 14, or 16.

The foregoing commands are exemplary only and are not to be construed as defining or otherwise limiting the commands which may be employed with control unit 200 or the present invention as a whole.

Figure 7:
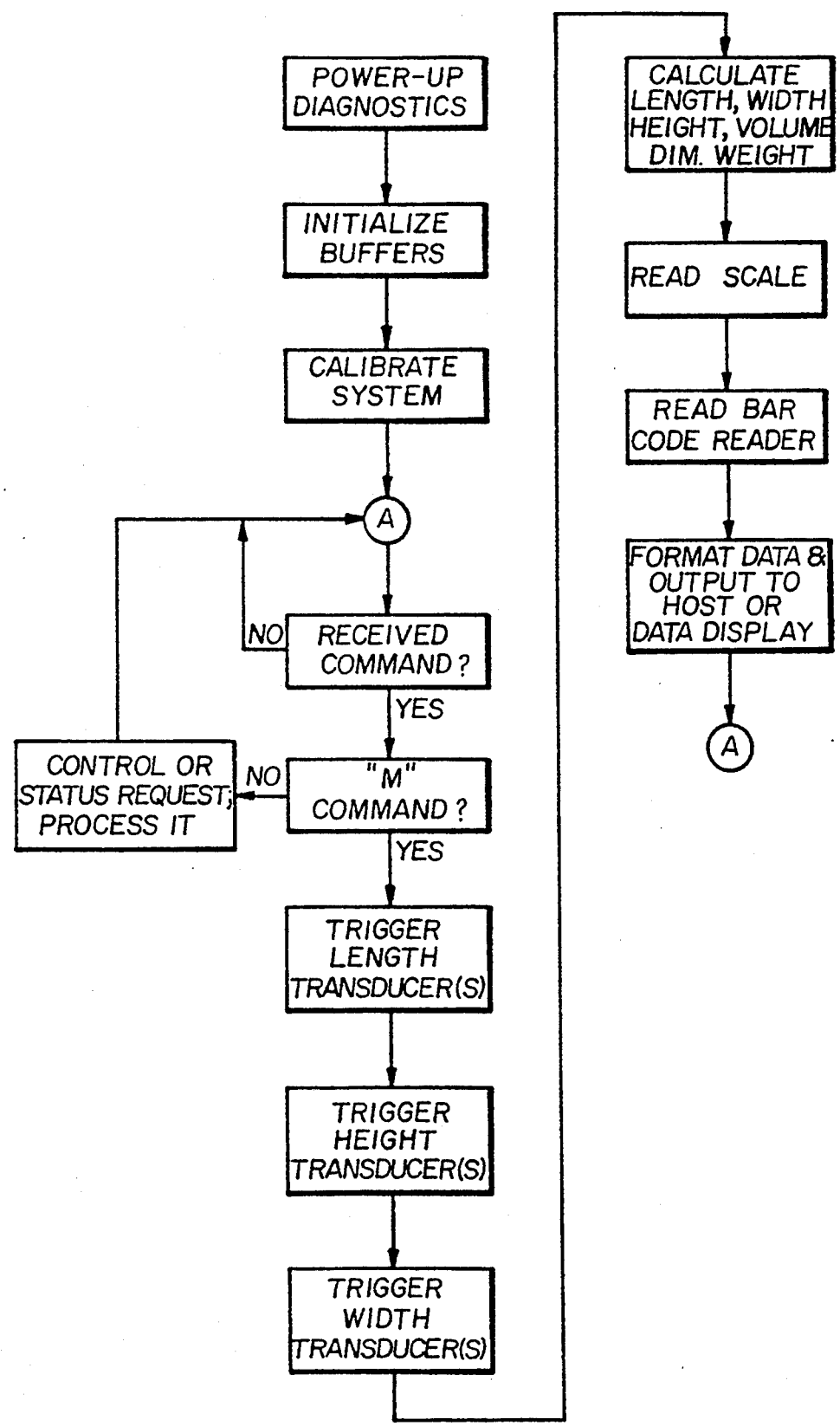
FIG. 7 comprises a flow chart of the operating sequence of the present invention.

FIG. 7 comprises a flow chart of the operation of unit 10 or unit 110. The chart is generally self-explanatory, the exception being the "control or status request" block wherein sensor status may be queried, the display format altered, or the output units (metric, English) changed. It will be noted that the length measurement is triggered first, which is desirable in unit 110 due to the movement of the measured object. Measuring length first reduces the amount of transducer or photocell movement or software correction required to compensate therefor. Height and width measurements may interchangeably be made subsequent to length, and the scale or other weighing means is triggered last to permit, in either unit 10 or 110, the system to stabilize from the weight and/or impact of the object reaching the scale portion of the conveyor or hitting the platen. The bar code may be read last, as shown in FIG. 7, first or at any other time.

It will be appreciated that the low power draw of the present invention, less than one ampere, renders the system easily adaptable to battery power, and, in fact, commercially available, non-interruptable power devices such as are generally used to power lights and equipment during power failures may be employed as power sources for portable installation of the present invention.

The previously described embodiments of the invention, while suitable for parcels and other objects of substantial size, are nonetheless poorly adapted to weigh and to measure the cubed volume of a stack or pile of articles on a pallet such as would be used in air freight operations. To that end, the embodiment 300 disclosed in FIG. 8 of the drawings has been developed.

Measuring station 300 is adapted for use with palletized or other large loads, including but not limited to, those handled by air freight carriers, trucking companies, and warehousing operations wherein a fork lift or other suitable pallet handling device transports a load 302 onto weighing deck 304 of a suitable platform deck scale such as the low profile Weigh-Tronix Model No. DSL 6060-05, available from Weigh-Tronix, Inc. This particular model of scale has been chosen by way of example and not limitation as a standard air freight pallet measures 52 on a side, and the selected Weigh-Tronix scale provides a square platform or deck 60" on a side, thus easily accommodating load 302 and defining a maximum horizontal target field.

When the load 302 is in position over weighing deck 304, substantially parallel to the sides thereof and preferably substantially centered thereon, it is lowered onto the deck 304 and the weight measured. At substantially the same time, four (4) downward-facing multiplexed ultrasonic height sensors 306 on gooseneck arm 308 are simultaneously fired. Sensors 306, which are disposed at a common distance above deck 304, emit ultrasonic waves having substantially identical velocities at the same time, and the first returning signal reflected from load 302 thus indicates the closest or, in this instance, the highest part of the load. The first returning signal is accepted by a control unit associated with the sensors, converted to a distance in the manner previously described, and subtracted from the known height of the sensor face above weighing deck 304 to provide the height of load 302. The remaining three reflected signals are gated out and thus disregarded. While sensors 306 have been depicted in a linear array, other arrangements such as a square array or diamond array are contemplated, the optimum configuration being dependent upon the size and shape of the horizontal target field.

A bank of four (4) multiplexed ultrasonic width sensors 310 substantially parallel to, above and facing one side of deck 304 is activated to simultaneously emit ultrasonic waves from each sensor 310 and receive those reflected back from the side of the load 302 nearest to them. The first returning reflected signal represents the shortest distance to load 302 and thus the closest point on the side of the load against which sensors 310 are arrayed. As with height sensors 306, all but the first returning signal from the bank of sensors 310 are discarded. Sensors 312, arrayed in a multiplexed bank of four (4) substantially parallel to and above the side of the deck 304 opposite adjacent sensors 310, operate in the same manner, being fired simultaneously at the load 302. The first returning reflected signal is selected as indicative of the point on load 302 closest to sensors 312, and the three remaining signals discarded. The first returning signals from sensors 310 and 312 are converted to distances, the two distances are added together and then subtracted from the known, previously measured distance between the opposing banks of width sensors 310 and 312 to obtain the width of load 302.

The depth of load 302 is determined by a combination of a bank of four (4) laterally spaced ultrasonic sensors 314, parallel to the front side or edge of deck 304 which is perpendicular to the sides abutted by sensors 310 and 312 and an infrared (IR) light curtain system at the rear edge or side of the deck 304, provided by IR emitter 316 and IR receiver 318, one suitable light curtain system being the BEAM-ARRAY System offered by Banner Engineering Corporation of Minneapolis, Minn. In the preferred embodiment, a one-foot length Model No. BME148A emitter is employed in alignment across weighing deck 304 with a one-foot Model No. BMR148A receiver. Emitter 316 employs infrared light emitting diodes (LED's) on 0.25 inch centers, and receiver 318 employs phototransistors centered on the same intervals. The LED's are fired sequentially along the length of the emitter 316 at a rate of four milliseconds per foot of emitter length. Each emitted LED IR beam is directed to its correspondingly aligned phototransistor in receiver 318. Emitter 316 and receiver 318 extend in parallel along opposing sides of the scale deck 304 inwardly from rear edge 320 of deck 304. To obtain load depth, the distance from the front edge 322 of the load 302 to sensors 314 is measured ultrasonically, using the first reflected signal acceptance technique previously described with respect to the height and width sensors, and the location of the rear edge 324 of load 302 is determined by a light curtain from emitter 316, which is broken by the rear edge 324 of the load 302. The ultrasonically measured depth distance from the front edge 322 of load 302 is then added to the detected distance between the IR light curtain break and the rear edge 320 of the scale deck 304 and that sum subtracted from the known distance between the bank of sensors 314 and the rear edge 320 of deck 304 to obtain the load depth.

It should be noted that measuring station 300 is easily adapted, depending upon the measurements desired or required by the user, to determine either pallet dimensions or the dimensions of the load resting on a pallet. Such adaptation is effected by placing ultrasonic sensors 310, 312, and 314 and emitter 316 and its companion receiver 318 at the appropriate height above deck 304. If placed just above deck 304, the sensing devices will respond to the pallet dimensions, while if placed sufficiently above the level of the pallet top, the sensing devices will respond to the objects thereon rather than the pallet itself.

Figure 8:
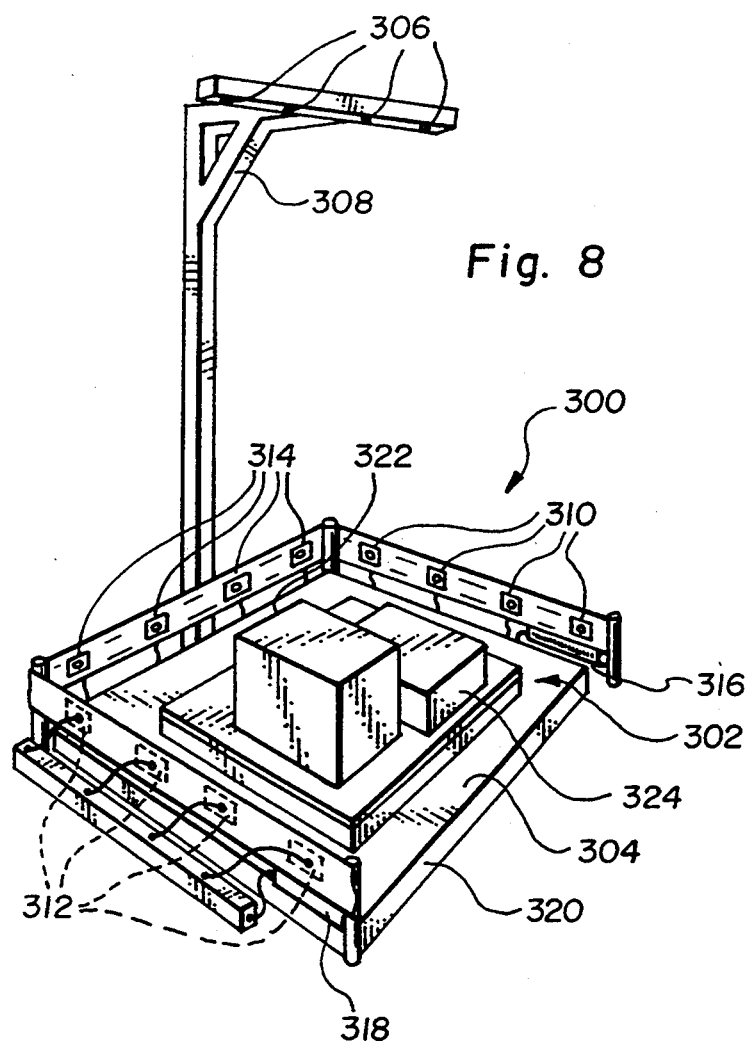
FIG. 8 comprises a perspective view of a preferred embodiment of a measuring station for large loads in accordance with the present invention.

The height, width and depth dimensions of load 302 may then be multiplied by a control unit associated with embodiment 300 to obtain the "cube" of the load and the data from measurement and weighing of the load stored in local memory associated with the embodiment 300 along with identifying indicia provided by a bar code reader, other automatic coding source, or manual entry. Alternatively or in addition, the data and load identifiers may be transmitted in real time to another location for storage or further action. As data acquisition, processing and storage activity has been previously described herein in substantial detail with respect to other embodiments of the invention, no further details thereof or the hardware for effecting same in the embodiment of FIG. 8 are believed to be necessary. However, it should be recognized that each sensor bank of embodiment 300, as alluded to above, is preferably controlled by a multiplexor, each multiplexor being in turn controlled to sequence the measuring operation by a master multiplexor, which also controls the scale and the IR light curtain emitter/receiver combination in this embodiment. The use of multiplexors being well known in the art and such devices being commercially available from a variety of vendors, the control and data acquisition system for the embodiment of FIG. 8 will not be further described.

The use of a plurality of laterally adjacent, similarly oriented ultrasound sensors in a bank is viewed as desirable to obtain the most accurate distance measurement possible between a side or the top of a palletized or other large load and the sensor bank, given the relatively large size of the load. The exact number of sensors employed in a bank is related to the maximum load dimension parallel to the sensor bank, the distance from the sensors to the load, the potential for irregularity of the load surface, and the required accuracy of measurement.

While embodiment 300 of the invention has been described as utilizing an IR light curtain in conjunction with ultrasonic sensors, it should be noted that an all-ultrasonic system might be employed. For example, a bank of sensors could be swung into position on a gate arm behind load 302 after its placement on deck 304. Alternatively, the sensor bank could swing up from the floor where it is protected by a grate or other means to support a forklift driving thereover.

Figure 9:
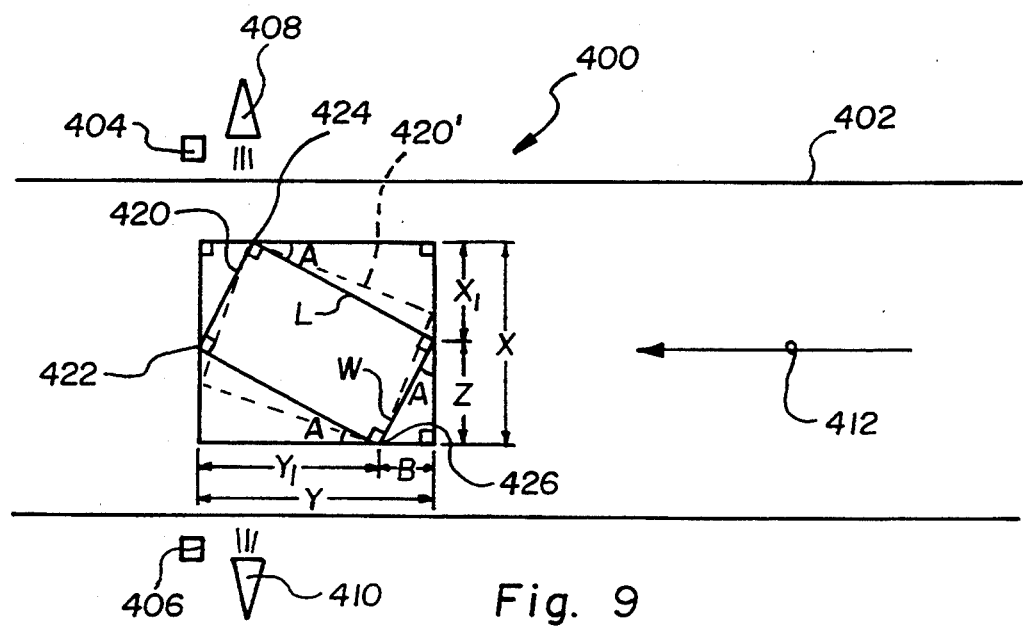
FIG. 9 comprises a schematic top elevation of one embodiment of the invention for determining the length and width of an object skewed with respect to the path of a conveyor on which it is moving.

The heretofore described embodiments of the invention, while suitable for measuring objects located anywhere within a given field, still require that the side of square or rectangular objects be aligned in a substantially perpendicular orientation to the ultrasonic sensor or bank of sensors to obtain accurate measurements of width and length. Such an alignment may be effected, as previously noted, by a skew conveyor or by hand. Since objects of square or rectangular shape comprise the vast majority of those shipped in commerce, alignment becomes a critical part, and limitation, of the measuring process. This limitation, however, is overcome in the embodiment 400 of FIG. 9, shown in association with a linearly moving conveyor 402. System 400 includes a through-beam photocell system including an infrared (IR) LED emitter 404 and phototransistor receiver 406 mounted directly across the conveyor from one another along a line perpendicular to the conveyor path. A through-beam photocell system signals when an emitted or outgoing light beam is not received, in contrast to a reflector-type system which signals when a beam normally reflected from a target does not return to the emitter/receiver. As a result, even polarized, reflector-type photocells may give false readings from reflective surfaces of tape and stretch or shrink-wrap films widely employed in packaging. Two ultrasonic sensors 408 and 410 are mounted, respectively, at the same locations as or immediately adjacent to emitter 404 and receiver 406 and are aimed perpendicularly to the path 412 of conveyor 402.

When an object 420 to be measured passes down conveyor 402, the leading edge or point 422 thereof breaks the photocell beam, resulting in the commencement of a timed "dark" period until the beam is again unbroken by object 420, the speed of the conveyor 402 being a known constant and permitting the user of the system to easily determine distance "Y" parallel to the conveyor path in a manner as previously described herein. The obstruction of the photocell beam also initiates the repeated triggering of the ultrasonic sensors 408 and 410, the readings from which ramp or vary as the ultrasonic signals repeatedly reflect from the obliquely oriented sides of the object 420 as its corners 424 and 426 first approach and then pass sensors 408 and 410, respectively. As a result, distance "X" perpendicular to the conveyor path is easily determined, being the sum of the shortest measured distance from each sensor 408 and 410 to the object 420, subtracted from the known total distance across conveyor 402 between the two sensors. One other dimension, B, is easily determinable from the constant conveyor speed and elapsed time between the instant when corner 426 passes sensor 410 and the end of the dark period when the LED beam again strikes receiver 406. The "X" and "Y" distances give an apparent "footprint" for object 420 which is, in actuality, larger than object 420 when the sides of object 420 are not parallel to conveyor path 412. In order to obtain the actual dimensions "L" and "W" of an object 420, X, Y, and B are employed as follows:

As shown in FIG. 9 of the drawings, the "footprint" of object 420 is much larger than its actual dimensions L and W. To determine L and W:

$$Y_1 + B = Y$$

$$X_1 + Z = X$$

this relationship equates to:

$$L\cos A + W\sin A = Y$$

$$L\sin A + W\cos A = X$$

which may also be represented as:

$$LZ/W + B = Y \quad (1)$$

$$LB/W + Z = X \quad (2)$$

Dividing Equation (2) by B yields:

$$\frac{L}{W} = \frac{X - Z}{B} \quad (3)$$

Substituting (3) into (1) we obtain:

$$\left(\frac{X - Z}{B}\right)Z + B = Y$$

Multiplying by B, this yields:

$$(X - Z)Z + B^2 = YB; \text{ or}$$

$$-Z^2 + XZ + B_2 - YB = 0; \text{ or}$$

$$Z^2 + (-X)Z + (BY - B^2) = 0$$

Therefore, $$Z = \frac{X \pm \sqrt{X^2 - 4(BY - B^2)}}{2} \quad (4)$$

or $$Z = \frac{X \pm \sqrt{X^2 - 4B(Y - B)}}{2}$$

Given $Z$, $W = \sqrt{Z^2 + B^2}$ and given Z and W, L=W(X−Z)/B. From equation (4), it is evident that Z may have two values, and thus there may be two distinct pairs of L and W, the second pair defining object 420' in broken lines on FIG. 9. But, returning again to equation (4), the values of Z are symmetric about X/2. Returning to FIG. 9, it is evident that sensor 410 measures one "Z" value at the leading edge and one at the trailing edge of object 420. Therefore, if the leading edge shows a value of Z>X/2 and the trailing edge shows a value of Z<X/2, then Z<X/2, and the smaller value of Z is employed to obtain L and W of object 420. If the leading edge Z<X/2 and the trailing edge Z>X/2, the larger value of Z is employed to obtain L and W of object 420. If the values for Z are the same at the leading and trailing edges, then there is only one solution for L and W.

Of course, in the unlikely event that object 420 is, in fact, perfectly aligned with conveyor path 412, the readings from sensors 408 and 410 will remain constant throughout the timed dark period, and the system will default to the trivial case wherein the timed distance Y is the length of the object, and the measured distance X is the object width.

While system 400 has been described in use with a conveyor system 402, it should be understood that system 400 is not so limited. Any linearly moving carrying or conveying means moving at a constant speed, such as an AGV, may be employed.

Figure 10:
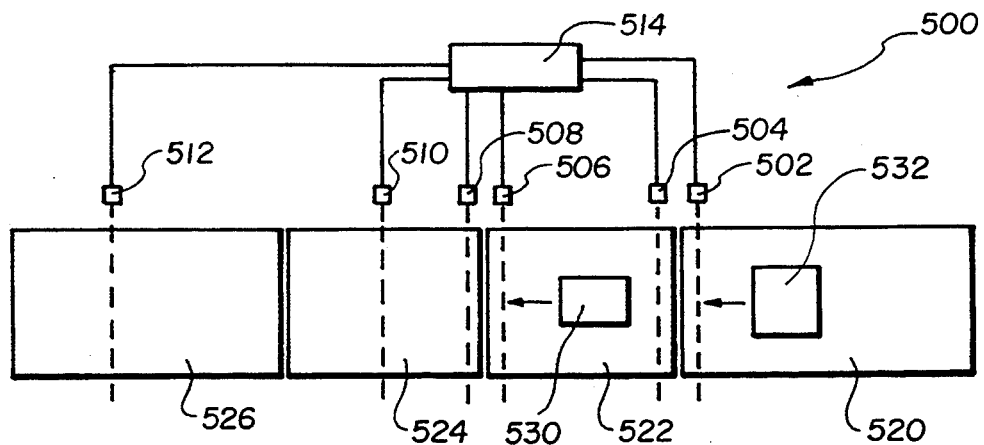
FIG. 10 comprises a schematic top elevation of a preferred embodiment of the invention utilizing a photocell-based detector and control system for a conveyor-fed weighing and measuring station.

In some instances wherein it is desired to measure objects on the fly down a conveyor, photocells may be employed both to ensure that the weight measurement is accurate and to provide security against pilferage or miscoding of packages. In such an embodiment, system 500 as shown in FIG. 10, photocells 502, 504, 506, 508, 510 and 512 are linked to a process control unit 514 in a manner well known in the art and are placed adjacent to a series of system components including skew conveyor 520, scale 522, cubing system 524 and takeaway station 526. Photocells 502–512 are preferably of the above-described through-beam type for the reasons previously discussed herein. Lead photocell 502 signals the process control unit 514 when a first package 530 or other object has passed off of skew conveyor 520. The beam of photocell 504 is broken by the passage of the first package 530 onto scale 522 and signals control unit 514 to activate scale 522 when its beam is again unbroken after the trailing edge of the first package has passed to ensure that the entire package is on the scale 522, and the correct package weight taken. Photocell 506 deactivates scale 522 via control unit 514 as the leading end of the first package 530 breaks its beam before passing off of the scale 522 onto cubing system 524, again to ensure a correct weight. If the first package 530 is longer than the scale 522, the process control unit 514 will tag the weight reading as an error. Photocell 508 signals when the first package enters cubing system 524, initiating the entry of a second package 532 from skew conveyor 520 onto scale 522. Photocell 510 activates the width and height measuring ultrasonic sensors (not shown) of cubing system 524 when the leading edge of a package breaks its beam and commences a time out or dark period which is directly related to the length of the object by the constant conveyor speed. Thus, weight, length, width and height of the package are ascertained in a manner previously described with respect to other embodiments and under photocell control. Photocell 512 at takeaway station 526 signals when a package has left the entire weighing and measuring system 500 after the bar code or other indicia on it has been read by an operator at takeaway station 526 so as to match up the measured dimensions and weight with the appropriate package in the data gathering portion of the control unit 514.

In furtherance of error and pilferage prevention, timed "windows" are built into the operation sequence of system 500. For example, given the known speed of the conveyor system, a package is normally on scale 522 for a maximum, fixed period of time. If a package passes photocell 502 but does not break the beam of photocell 508 in a given time, the system signals that the package is missing. Likewise, if the package passes into cubing system 524 and triggers photocell 508 but does not trigger photocell 510 within a given period of time, the system notes that the package is missing. Further, the operator at takeaway station 526 has a certain amount of time to perform his or her function after the package passes photocell 510. If the package does not pass photocell 512 during the aforementioned takeaway station window, the skew conveyor 520 stops so that the operator is not inundated with packages, and again an error signal is generated to note a potential problem. At any given instant, there are only two packages in the queue in system 500. If any error signals occur, the second, trailing package in the system (the first, leading one presumably being missing for some reason) will continue to takeaway station 526, but no new packages will be fed from skew conveyor 520. The aforementioned time windows are set in view of the speed of the conveyor system and the normal time required for operations being performed at takeaway station 526. Thus, pilferage is virtually eliminated from the time a package enters system 500 until its exit therefrom. Further, packages falling off of a conveyor or being removed during the measuring process, which could result in a package being erroneously associated with the weight and/or dimensions of a prior package in queue, are eliminated.

Figure 11:
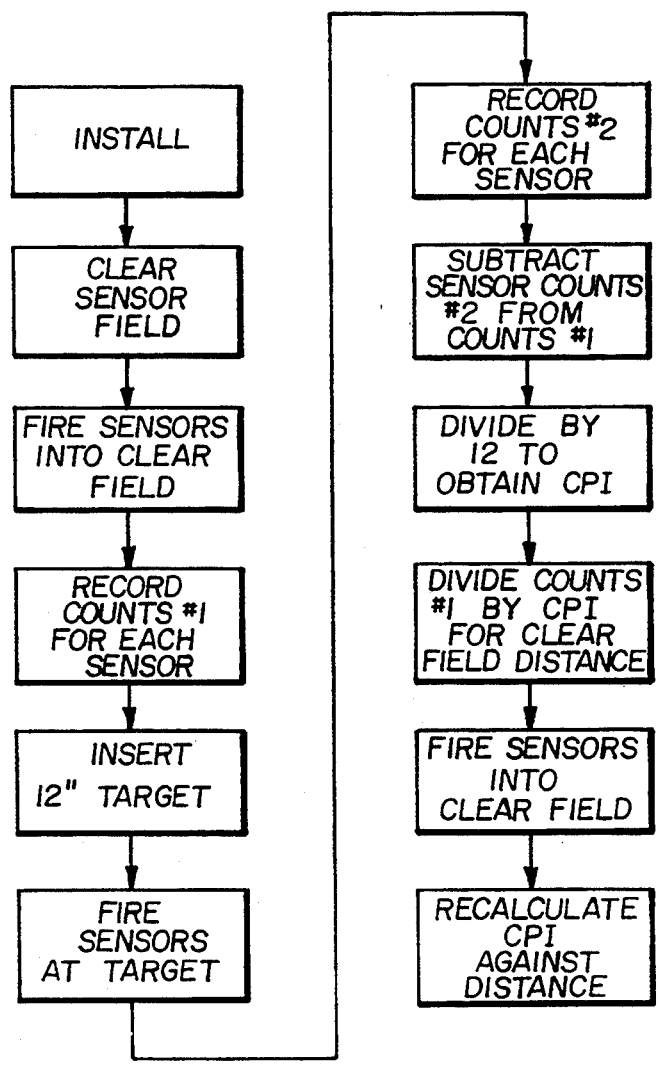
FIG. 11 comprises a flow chart of an improved method for calibrating ultrasonic sensors.

Calibration of the ultrasound sensors of the present invention may also be more readily and repeatedly effected via the use of a battery-backed RAM autocalibration system. Operation of the calibration system is shown in flow chart form in FIG. 11, and is as follows. An "Install" command is given to the system which prompts the user to remove all objects from the sensor field. Each of the sensors is then fired individually, and the number of time counts from each sensor to and from an empty platform is recorded. The system then prompts the user to insert a target of 12" extent (by way of example and not limitation) in each dimension orientation being calibrated on the measuring platform, the sensors are fired again, and the counts per inch (CPI) for each individual sensor are determined by subtracting the total counts resulting from the 12" target firing from those resulting from the empty platform firing, and dividing by 12. The distance from the back wall of the empty platform to the sensor is then calculated by dividing the "zero" or empty platform count by the CPI. This base or "zero" distance is used in measuring objects by firing the sensor at the object, calculating the distance between the sensor and the object, then subtracting it from the zero distance to get the object dimension. While the CPI can vary with environmental conditions, as previously noted, the distance between the sensor face and the platform wall remains constant, so periodic sensor firings onto the empty platform subsequent to the initial calibration result in automatic adjustment of the CPI figure to the fixed, known distance.

Figure 12:
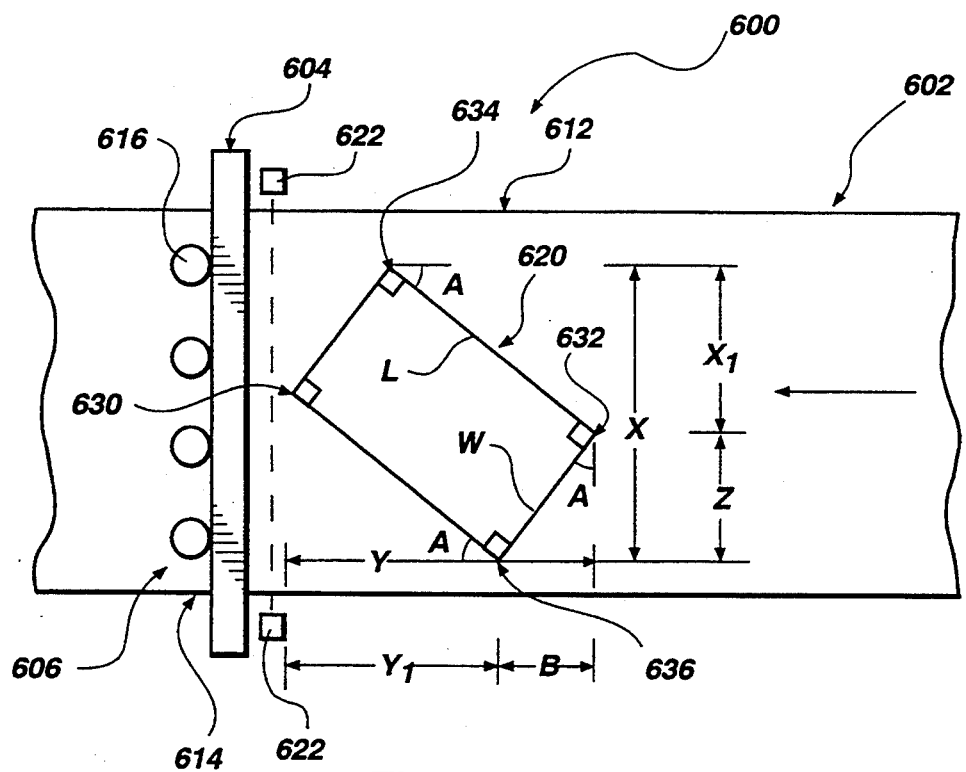
FIG. 12 comprises a schematic top elevation of a preferred embodiment of the invention for determining the length and width of an object skewed with respect to the path of a conveyor on which it is moving.
Figure 13:
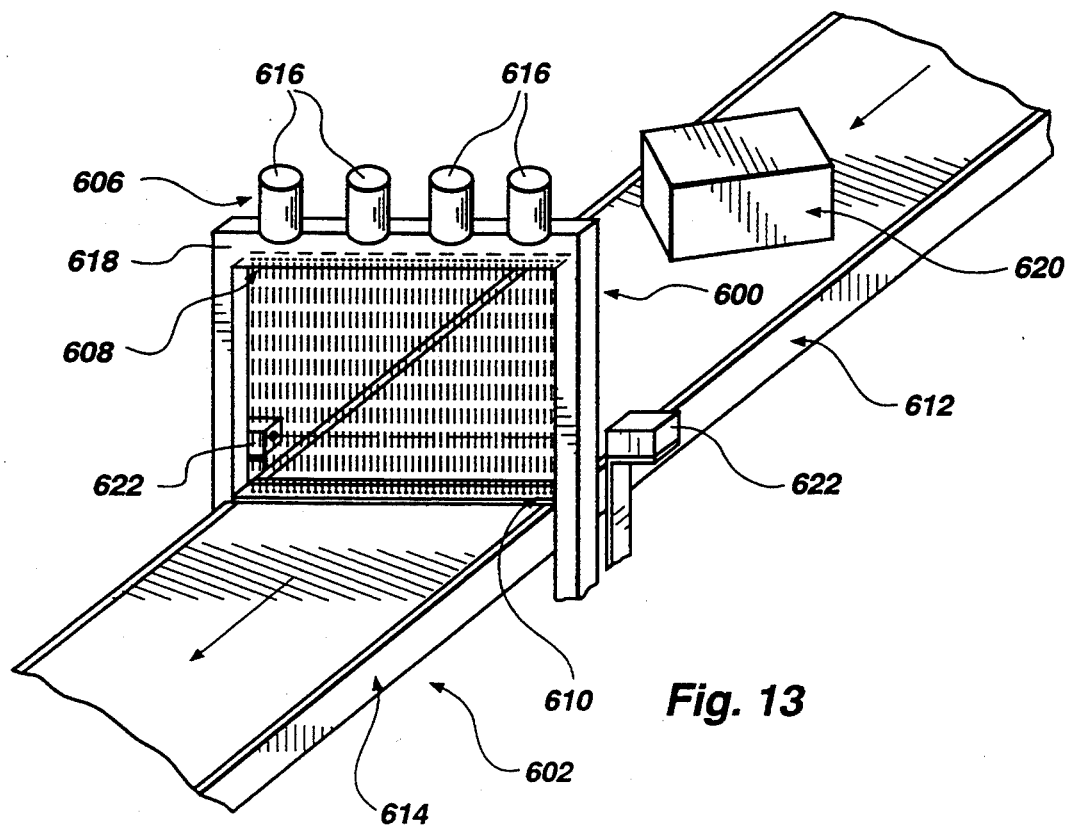
FIG. 13 comprises a perspective view of the apparatus of FIG. 12, showing in addition the deployment of a bank of ultrasonic height sensors.

FIGS. 12 and 13 of the drawings depict a preferred embodiment 600 of apparatus for effecting measurements used in the measurement method described with respect to system 400 and FIG. 9. System 600 is employed in conjunction with a linearly moving conveyor system 602, and includes an infrared (IR) light curtain system 604 disposed perpendicular to the conveyor path, and an ultrasonic sensor system 606 having at least one ultrasonic transducer or sensor of the type previously described above. The light curtain system 604 includes an IR emitter 608 and an IR receiver 610, one disposed horizontally above and perpendicular to conveyor 602, and the other in alignment therewith and disposed horizontally with its top surface at the level of, perpendicular to, and between feed conveyor 612 and takeoff conveyor 614 of conveyor system 602. While IR emitter 608 is shown in FIG. 13 to be above conveyor system 602 and IR receiver 610 is shown to be therebelow, the emitter and receiver unit positions may be interchanged, as long as the emitter and receiver are disposed so that each light emitting element in the IR emitter 608 is aligned with its companion receiving element in IR receiver 610.

A suitable light curtain system for use in the present invention is the aforementioned BEAM-ARRAY system offered by Banner Engineering Corporation of Minneapolis, Minn. In the preferred embodiment, by way of example and not by limitation, a four (4) foot length Model BME448A emitter is employed in alignment with a four (4) foot BMR448A receiver. IR emitter 608 employs infrared light emitting diodes (LED's) on 0.25 inch centers, and IR receiver 610 employs a like number of phototransistors centered on the same intervals. The LED's are fired sequentially along the length of the emitter 608. Each emitted LED beam is directed to its correspondingly aligned phototransistor in receiver 610.

Ultrasonic sensor system 606 includes at least one downwardly facing ultrasonic emitter/receiver transducer 616, but the preferred embodiment employs four (4) such transducers or sensors 616, aligned in a row above and perpendicular to the path of conveyor system 602. While not essential to the operation of system 600, it is preferred for compactness that sensors 616 be mounted on the same frame 618 as IR light curtain emitter 608. Sensors 616 are disposed at a common distance above the surface of conveyor system 602, and are multiplexed. When fired, all of the sensors 616 simultaneously emit ultrasonic waves having substantially identical velocities, and the first returning signal reflected from an object 620 on the conveyor system indicates the closest, or in this instance, the highest part of the object and thus its maximum height. The first returning signal is accepted by a control unit associated with system 600, converted to a distance in the manner previously described, and subtracted from the known height of the sensor face above the conveyor surface. The remaining signals are gated out and thus disregarded. While sensors 612 have been depicted in a linear array oriented perpendicularly to the conveyor system 602, this is not required and any grouping which covers the entire width of the conveyor system may be employed.

In order to ascertain the true length and width of a rectangular object 620 according to the methodology previously described with respect to system 400 and FIG. 9 of the drawings, conveyor system 602 must move object 620 at a substantially constant linear rate past light curtain system 604. The rate of speed is not important, as long as it does not exceed the speed at which the light curtain 604 can sequence through all of the emitter-receiver combinations of LED's and phototransistors. For example, when the aforementioned BEAM-ARRAY light curtain is employed in the present invention, with LED/phototransistor pairs at 0.25 inch intervals and a factory preset scan rate of 4 milliseconds per foot of array length, it takes 16 milliseconds to complete a scan using a four foot light curtain. If an object 620 is passing through the curtain at 300 feet per minute velocity, it will travel 0.96 inches during a single scan of the light curtain, or an approximate accuracy of within one (1) inch. Of course, if the scan rate were to be increased by employing a higher clock speed with a clock external to the system (or employing a higher speed internal clock), and/or the conveyor speed was reduced, accuracy could be increased. For example, using a scan rate of 2 milliseconds per foot and a conveyor speed to 150 feet per minute, an object 620 will travel only 0.24 inches per scanning cycle. Since the light curtain sensors are at 0.25 inch intervals, the system 600 would then be operating at its maximum possible accuracy.

It is desirable to operate light curtain 604 in a continuous scan mode, with each scanning cycle immediately following completion of the preceding one. The scanning cycles can be activated continuously while the conveyor is in motion, or may be triggered by a beam-interrupt type photocell, as previously described. In the preferred embodiment shown in FIGS. 12 and 13, a separate photocell trigger 622 is employed.

Operation of system 600 is as follows. When an object 620 approaches system 600 on conveyor 602, it breaks the beam of photocell trigger 622, activating the light curtain system 604 in a continuous scan mode. As each scan is conducted, phototransistors covered by the object 620 will be blocked from receiving a light beam from their associated LED, indicating the width of that section of object 620 perpendicular to the path of the conveyor system 602. Thus, the width and time of passage of each succeeding section of object 620 is measured as it passes through light curtain 604, as well as the position of the section on the conveyor.

The presence and the time of passage of leading edge 630 of object 620 is sensed by the light curtain when an emitter/receiver pair is first obstructed, and the time of passage of trailing edge 632 is similarly sensed when all phototransistors of IR receiver 610 become uncovered. It should be noted that the presence and time of passage of the object 620 may also be determined by using the dark period of the beam-interrupt type photocell trigger 622. Using the time of object passage, it is thereby possible to ascertain the apparent length Y of object 620. This may be effected in several ways. One way is to set conveyor system 602 to a selected speed, which is then multiplied by the time of object passage. Another, more preferred methodology uses no preset speed, but only a control object of a known length, for example, one foot, which is placed on conveyor system 602 to pass through light curtain 604. The time of passage is then recorded by system 600 against the control object length, converted to a distance per time multiplier, and employed by a system 600 to measurement of unknown objects. Finally, a speedometer might be used to monitor conveyor speed, but this alternative is also less preferred.

The apparent width X of object 620 is obtained during the continuous scan process of the light curtain, as the system 600 records all consecutive scans of object 620, stores in buffer memory, then sorts to locate the position of the farthest laterally outwardly extending corners 634 and 636 on object 620, and computes the distance therebetween, taken in a direction perpendicular to the conveyor path.

Finally, one other dimension, B, is easily determinable since the time of passage of corner 636 through light curtain 604 has been recorded, as well as the time of passage of trailing edge 632. Subtracting to obtain elapsed time and multiplying by the aforementioned distance per time multiplier, distance B is calculated.

Given X, Y and B, the actual length L and actual width W may then be calculated in the manner previously described with respect to FIG. 9.

Ultrasonic sensor system 606 is likewise triggered by photocell trigger 622, and the array of multiplexed sensors 616 fired at several preset intervals as previously described to obtain the maximum height of the object 620. While a single firing is adequate for objects of constant height, such as cubic boxes, if the object is a load of various items on a pallet this will not be the case, and multiple firings are necessary.

Once the true length and width of object 620 are ascertained, and the maximum height, the cubic volume or spatial volume of the object may be computed for use as previously described.

It is possible to utilize a light curtain height sensor in lieu of an ultrasonic system, but this alternative is not preferred in view of the high cost of light curtain systems.

Figure 14:
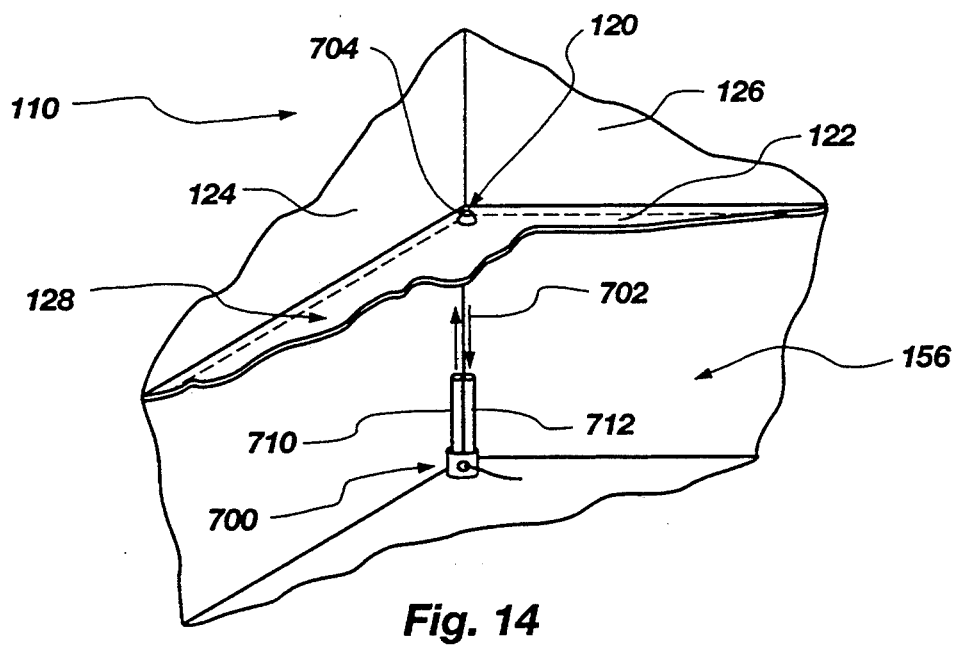
FIG. 14 comprises an enlarged, partially cut-away, partial perspective view of the apparatus shown in FIG. 3 having a preferred embodiment of the object placement detection means of the present invention incorporated therein.
Figure 15:
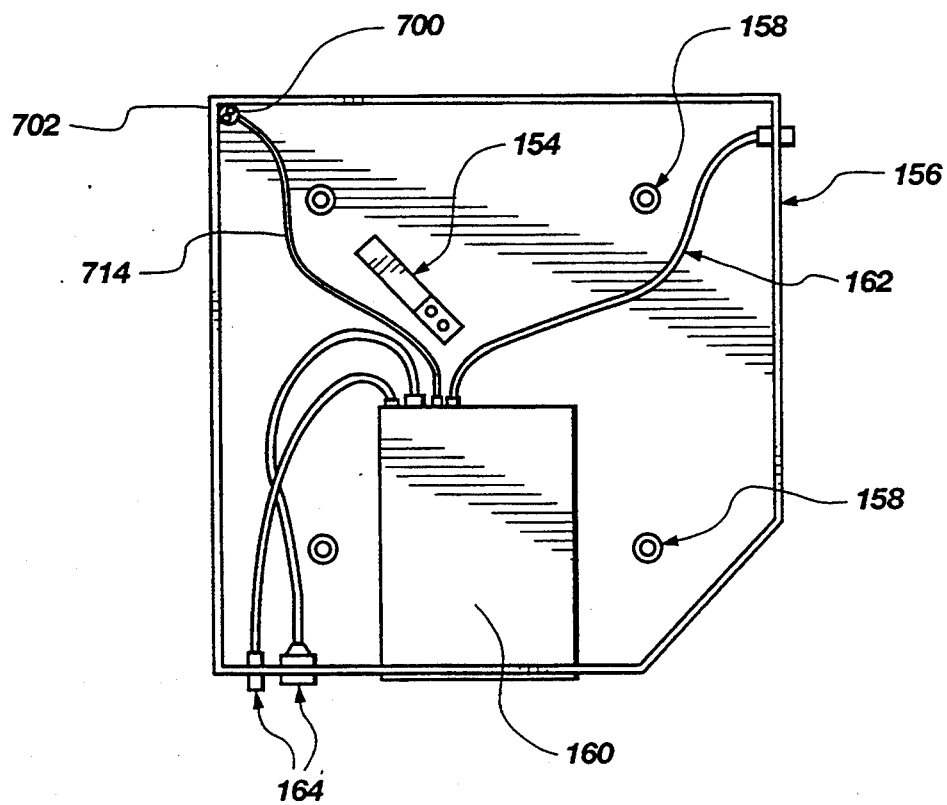
FIG. 15 comprises a view similar to that of FIG. 4 and showing, from above, the location of the object placement detection means of the present invention.

Referring to FIGS. 14 and 15 of the drawings, a preferred embodiment 700 of an object placement detector according to the present invention is depicted as preferably installed in stationary measuring unit 110. Detector 700 is located within and supported by support housing 156, which supports jig 112 via load cell 154. Detector 700 is placed in corner 702 of support housing 156 and aimed upwardly through aperture 704 in platen 128 immediately adjacent corner or zero point 120, where base 122, left side 124 and right side 126 meet in mutually perpendicular relationship as shown in FIG. 14.

Detector 700 preferably comprises a light emitter 710 such as an LED, and a light receiver 712, such as a phototransistor, paired in side-by-side relationship and both aimed at aperture 704, which is preferably of frustoconical shape with the small or constricted end opening onto the surface of platen 128. This configuration is desirable as it will restrict entry of dirt and debris into the aperture, and cause any particulate matter which does enter the aperture to fall quickly so that the light beam is unobstructed. Emitter 710 is activated either periodically or continually after unit 110 is switched on, as is receiver 712. However, in order to activate the measuring and weighing sequence (if the latter is desired), the open circuit existing when the light beam from emitter 110 travels through aperture 704 must be closed by the placement of an object to be measured onto platen 128 and closely adjacent corner or zero point 120 so as to cover aperture 704 and reflect the light beam back to receiver 712 to complete the circuit via cables 714, which extend to internal electronics 160 for unit 110. The emitter/receiver combination employed in detector 700 may be any suitable assembly, such as the SE 612 FP Controller, available from Banner Engineering Corporation of Minneapolis, Minn. In lieu of aiming the emitter and receiver at aperture 704, a mirror or prism may be employed to redirect light toward and from said aperture.

Alternatively, other sensor technologies may be employed such as a microswitch mounted on support housing 156 immediately under platen 128 and having a lightly spring-loaded probe extending upwardly through aperture 704. Contact of an object with the probe would close the microswitch and the circuit. Another alternative is an air pressure sensor and small blower having an outlet tube aimed upwardly through aperture 704. Placement of an object over aperture 704 would increase the pressure in the outlet tube and cause the pressure sensor to close the unit's activation circuit. A similar system could be used with the blower drawing a vacuum through aperture 704. A further alternative would be a light level sensor placement immediately under the platen 128 so as to react to the removal of ambient light caused by coverage of aperture 704 by an object.

The major consideration for use of a detector 700 is that it be substantially isolated from jig 112 so that its presence does not affect the weight reading provided by load cell 154. Of course, placement of detector 700 under zero point 120 presupposes that one is measuring a rectangular object, a corner of which will extend into corner 120 and cover aperture 704. Since the vast majority of packages and other measured objects are of such configuration, however, the utility of this aspect of the present invention is readily apparent.

Another adaptation of detector 700 is to the dynamic measurement unit 10 as depicted in FIGS. 1 and 2 of the drawings. Since objects must be aligned with the direction of travel for accurate width and length measurement, a downwardly focused emitter/receiver pair located above and slightly inwardly of zero point 36 (see FIG. 1) would provide a means to assure that an object edge was aligned with the direction of motion 20 and at one side of conveyor means 18. If the object (26 or 28, as shown in FIG. 1) was skewed during its passage past zero point 36, the measurement unit would be disabled or provide an error signal unless both photocell 22 and detector 700 indicated the presence of the object for its entire travel time past zero point 36. Use of a non-reflective conveyor surface would be desirable to enhance accuracy of the detector. As an alternative placement, detector 700 could be placed at an appropriate location between feed and take-away conveyors and aimed upwardly as previously described with respect to a stationary measuring unit.

Figure 16:
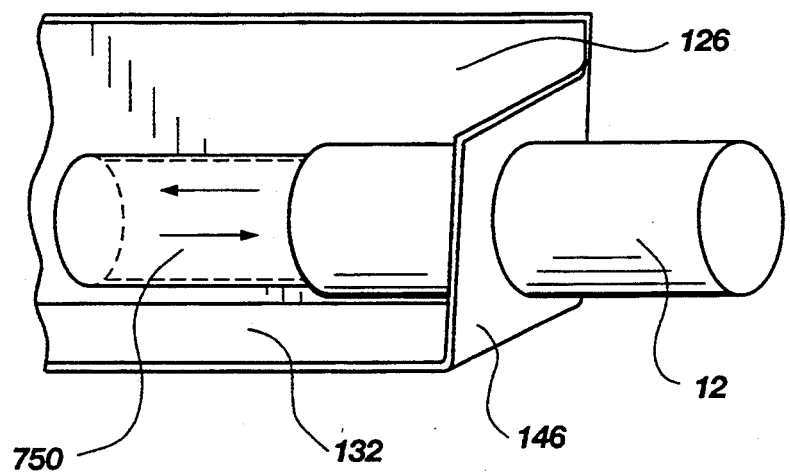
FIG. 16 comprises an enlarged, partially cut-away partial perspective view of the apparatus shown in FIG. 3, having the preferred embodiment of the waveguide standoff means of the present invention in place.

Another aspect of the invention, as depicted in FIG. 16 of the drawings, is the use of a tubular waveguide isolator 750 at the faces of a sensor 12, 14, or 16 as employed in the invention as described previously with respect to FIGS. 1 through 4. Waveguide isolators 750, as employed herein, are not for the purpose of focusing outgoing ultrasonic waves, but for the purpose of eliminating stray waves reflected from different objects and primarily to prevent placement of too large an object in any dimension within the measuring range defined by the sensor placements. Stated another way, the standoff prevents an object's presence in the "near field" of the sensor. Thus, waveguide isolator 750 functions as both a standoff and as a stray-wave filter or isolator. As noted previously, if an object intrudes too closely in front of the sensor, high frequency waves will travel to and from the object being measured back to the sensor too rapidly for it to react and receive the first reflection. Since the wave will be reflected multiple times between the sensor and the object, the sensor may then pick up the second, third or subsequent reflection and thus ascribe a greater distance between sensor and object (distance being based on travel time) and consequently too small a dimension to the object. In addition to the previously-stated advantages, waveguides substantially enclose the sensor faces and protect same from damage and contamination from dust, dirt and moisture.

While described with reference to the embodiments of the invention depicted in FIGS. 1 through 4, it will be appreciated that the waveguide isolator 750 may be employed with any of the ultrasonic sensor apparatus disclosed herein.

Figure 17:
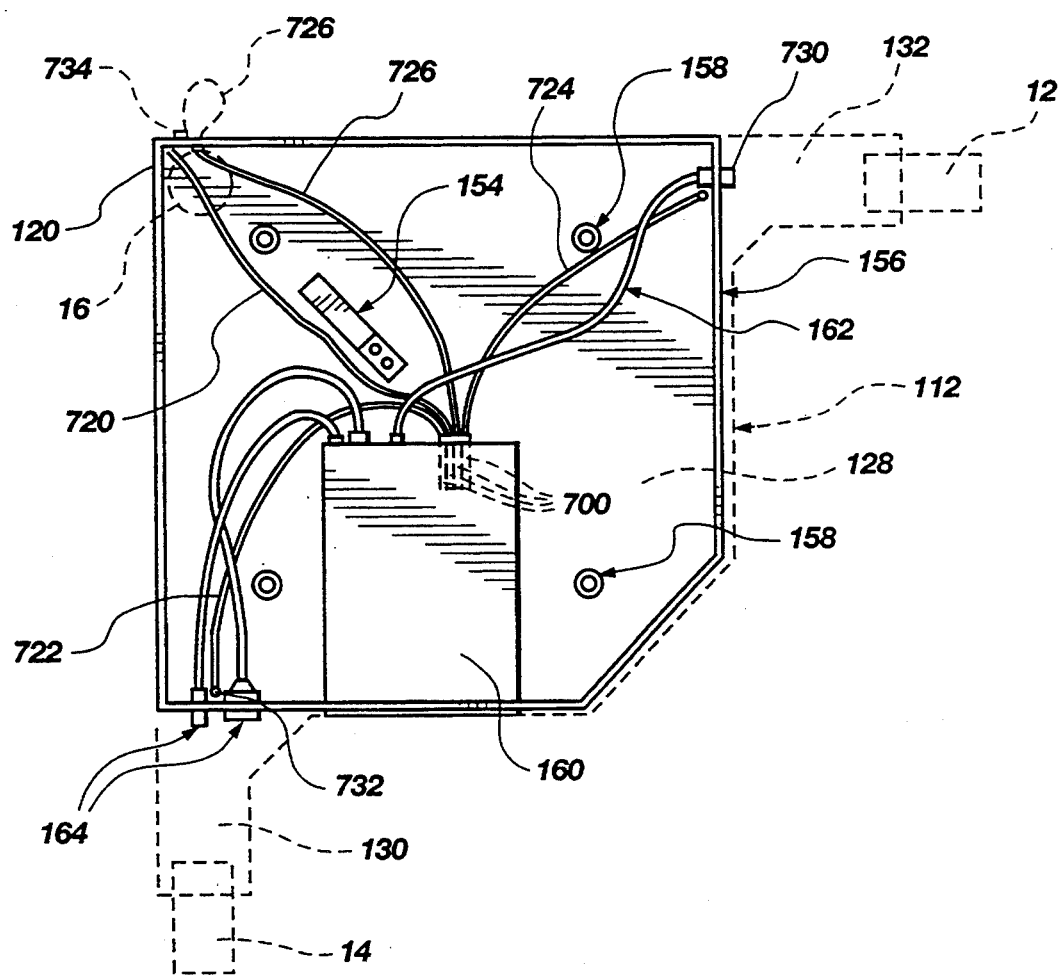
FIG. 17 comprises a view similar to that of FIG. 16, but with an object support platen shown overlaid in broken lines and a fiber optic light transmission media version of the placement detection means of the present invention employed for both zero point and sensor near field detection of object placement.

FIG. 17 illustrates yet another aspect of the present invention, wherein object placement detectors 700 of the light beam emitter/receiver type previously described are employed not only to detect object placement at a zero point 120 but also to detect the presence of an object in the near field of reflected-wave sensors such as 12, 14 and 16. In the embodiment of FIG. 17, four (4) object placement detectors are employed, one for zero point 120 as in FIGS. 14 and 15, and three additional detectors to detect near field intrusion by an object to be measured. In further distinction from the previously described embodiment, all detectors 700 are housed with other internal electronics 160 for unit 110, and the emitted and received light beams are conducted from and to each of detectors 700 via pairs of fiber optic cables 720, 722, 724 and 726 which are shown larger than actual diameter for clarity. Suitable cables are commercially available as part number PBT 26U from the aforementioned Banner Engineering Corporation. Each cable pair's free end is positioned immediately below an aperture (not shown) in object support platen 128, or other portion of jig 112, one of the apertures 704 being at zero point 120, and the others in front of sensors 12, 14 and 16 at points 730, 732 and 734. These latter detection points will disable, rather than enable, measuring unit 110 if an object covers a platen or other jig aperture and completes a circuit via reflection of the light beam emitted from the end of an emitter cable of a cable pair employing fiber optic cables which permits placement and protection of detectors 700 with other unit electronics and also facilitates replacement of same, if such action is even required, without removal of jig 112 from support housing 156. As with the previously described embodiment employing an object placement detector 700, the multiple detectors 700 and fiber optic cables 720, 722 and 724 are isolated from support platen 128 to avoid compromising the weight readout from load cell 154. In the case of protecting the near field of height sensor 16, the attachment of the free end of that cable 726 to jig 112 at arm 118 (see FIG. 3) is unavoidable without adding substantial structure to unit 110, but the minimal weight of fiber optic cable 720 coupled with its position above zero point 120 minimizes any potential error and its presence may be easily addressed during calibration of load cell 154. Electronics for processing signals from object placement detectors 700 being well known in the art, such will not be described in detail.

It is thus apparent that a novel and unobvious measuring method and apparatus has been described in a variety of embodiments. Many additions, deletions, and modifications to the preferred embodiments may be made without departing from the scope of the invention as hereinafter claimed.

What is claimed is:

1. An apparatus for measuring at least one dimension of an object, comprising:
    an object support platen means;
    a zero point on said object support platen means;
    at least a first sensor means for determining a first dimension of said object between said first sensor means and said zero point;
    object detection means to sense the presence at said zero point of an object to be measured and to generate a signal responsive to said presence; and
    means responsive to said object detection means signal for enabling said at least first sensor means to determine at least said first dimension of said object.

2. The apparatus of claim 1, wherein said object support platen means is stationary, said apparatus further includes at least a second sensor means for determining a second dimension of said object between said second sensor means and said zero point, said first and second dimensions are mutually perpendicular, said apparatus includes object alignment means for alignment of substantially rectangular objects on said object support platen so that one corner of a said object may be placed at said zero point, and said enabling means enables both of said sensors responsive to said signal.

3. The apparatus of claim 1, wherein said object support platen means is linearly movable, said apparatus further includes at least a second sensor means for determining a second dimension of said object between said second sensor means and said zero point, said first and second dimensions are mutually perpendicular, said apparatus further includes means for aligning substantially rectangular objects to be measured so that one side of a said object is aligned with said linear movement of said object support platen means, said zero point is located in the line of travel of said aligned side of a said object, and said enabling means enables both of said sensors responsive to said signal.

4. The apparatus of claim 1, wherein said object detection means is isolated from said object support platen means.

5. The apparatus of claim 1, wherein said object detection means is located underneath said object support platen means.

6. The apparatus of claim 5, further including an aperture through said object support platen means proximate said zero point, and wherein said object detection means detects the presence of said object through said aperture.

7. The apparatus of claim 6, wherein said object detection means comprises a light emitter and a light receiver, both aimed through said aperture, and said object presence is detected through reflection of light from said object.

8. The apparatus of claim 7, wherein said light emitter and light receiver are at a location remote from said aperture, and further including a fiber optic cable associated with each of said light emitter and said light receiver for respectively transmitting light from said light emitter to said aperture and receiving said transmitted light reflected from an object covering said aperture.

9. The apparatus of claim 6, wherein said object detector means comprises switch means including probe means extending through said aperture.

10. The apparatus of claim 6, wherein said object detection means is adapted to measure changes in air pressure at said aperture attributable to the presence of a said object.

11. A method of obtaining a calibrated object dimension using an ultrasound sensor employed in dimensional measurement of said object, said method comprising:
    providing a said ultrasound sensor a fixed, clear field distance from, and aimed toward, a zero point having a reflective surface substantially perpendicular to said direction of aim;
    activating said ultrasound sensor to emit at least one ultrasonic wave pulse and receive said at least one emitted pulse after reflection from said reflective surface;
    measuring a first travel time of said at least one ultrasonic wave pulse between emission and receipt by said ultrasound sensor;
    inserting between said ultrasound sensor and said reflective surface an object having at least one known dimension adjacent said reflective surface with said at least one known dimension extending toward said ultrasound sensor and a side of said object closest to said ultrasound sensor substantially perpendicular to said direction of aim;
    activating said ultrasound sensor to emit at least a second ultrasonic wave pulse and receive said at least one emitted pulse after reflection from said object side;
    measuring a second travel time of at least said second ultrasonic wave pulse between emission and receipt by said ultrasound sensor;

subtracting said second travel time frown said first travel time;

dividing the remainder from said subtraction by said at least one known dimension;

dividing said first travel time by the result of said division operation to obtain said clear field distance;

periodically activating said ultrasound sensor into said clear field to emit additional ultrasonic wave pulses against said reflective surface, measuring the travel time between emission and receipt of each said wave by said ultrasound sensor; and periodically dividing said periodic clear field travel time by said clear field distance to obtain a periodically updated time per dimensional unit calibration factor.

12. The method of claim 11, further including:

placing an object having an unknown dimension adjacent said reflective surface with said unknown dimension substantially perpendicular to said reflective surface between said reflective surface and said ultrasound sensor;

activating said ultrasound sensor to emit at least one ultrasonic wave pulse and receive said at least one emitted pulse after reflection from said object of said unknown dimension;

measuring the travel time of said at least one ultrasonic wave pulse between emission, reflection from said object of unknown dimension and receipt by said ultrasound sensor;

dividing said travel time of said wave reflected from said object of unknown dimension by said time per dimensional unit calibration factor to obtain the distance between said sensor and said object of said unknown dimension; and subtracting said sensor to object of unknown dimension distance from said clear field distance to obtain said unknown dimension.

13. An apparatus for measuring at least one dimension of an object through the use of at least one reflected wave sensor, comprising:

an object support platen means;

a said at least one reflected wave sensor aimed toward a target location on said object support platen means;

object detection means between said at least one sensor and said target location to sense the presence of a said object at an undesired location in too close a proximity to said at least one reflected wave sensor and to generate a signal responsive to said presence; and means responsive to said object detection means signal for disabling said at least one reflected-wave sensor.

14. The apparatus of claim 13, wherein said object detection means comprises a paired light emitter and light receiver, the latter for detecting light emitted by the former and reflected from said object at said undesired location in too close a proximity to said at least one sensor.

15. The apparatus of claim 14, wherein said light emitter and said light receiver are each remote from said location, and further including fiber optic cables for transmitting said light to said undesired location from said remote light emitter and from said location to said light receiver.

* * * * *